(12) United States Patent
Osaka

(10) Patent No.: US 8,896,876 B2
(45) Date of Patent: Nov. 25, 2014

(54) INFORMATION PROCESSING APPARATUS AND CONTROL METHOD

(75) Inventor: Hitoshi Osaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1611 days.

(21) Appl. No.: 12/260,733

(22) Filed: Oct. 29, 2008

(65) Prior Publication Data

US 2009/0109480 A1    Apr. 30, 2009

(30) Foreign Application Priority Data

Oct. 31, 2007 (JP) .................... 2007-283546

(51) Int. Cl.
| | | |
|---|---|---|
| *G06F 3/12* | (2006.01) | |
| *G06K 15/02* | (2006.01) | |
| *H04N 1/46* | (2006.01) | |
| *H04N 1/00* | (2006.01) | |
| *H04N 1/387* | (2006.01) | |
| *G06F 17/21* | (2006.01) | |
| *G06T 11/60* | (2006.01) | |

(52) U.S. Cl.
CPC .............. *G06F 17/211* (2013.01); *G06T 11/60* (2013.01); *H04N 1/3871* (2013.01)
USPC ........... 358/1.18; 358/1.1; 358/1.15; 358/1.9; 358/501; 358/540; 358/401; 358/450; 715/204; 715/235; 715/243; 715/247; 715/788

(58) Field of Classification Search
USPC ......... 358/1.1, 1.15, 1.18, 1.9, 501, 540, 401, 358/450; 715/204, 235, 243, 788
See application file for complete search history.

(56) References Cited

U.S. PATENT DOCUMENTS

| | | | |
|---|---|---|---|
| 6,377,704 B1* | 4/2002 | Cooperman | 382/176 |
| 6,589,292 B1* | 7/2003 | Langford-Wilson | 715/210 |
| 6,620,206 B1* | 9/2003 | Seaman et al. | 715/232 |
| 2002/0165937 A1* | 11/2002 | Nitta et al. | 709/217 |
| 2003/0179201 A1* | 9/2003 | Thacker | 345/441 |
| 2003/0222921 A1* | 12/2003 | Rummel | 345/788 |
| 2006/0044615 A1 | 3/2006 | Kobashi et al. | |
| 2006/0193008 A1 | 8/2006 | Osaka et al. | |
| 2006/0198555 A1* | 9/2006 | Hosotsubo | 382/162 |
| 2008/0046813 A1* | 2/2008 | Doatmas et al. | 715/240 |
| 2008/0256439 A1* | 10/2008 | Boreham et al. | 715/246 |
| 2008/0266606 A1* | 10/2008 | Huenemann | 358/1.18 |
| 2009/0138817 A1* | 5/2009 | Oron et al. | 715/788 |

FOREIGN PATENT DOCUMENTS

| | | |
|---|---|---|
| EP | 1696337 A2 | 8/2006 |
| JP | 2000-48216 A | 2/2000 |
| JP | 2006-74226 A | 3/2006 |
| JP | 2006-243805 A | 9/2006 |

* cited by examiner

*Primary Examiner* — Beniyam Menberu
(74) *Attorney, Agent, or Firm* — Canon U.S.A. Inc. IP Division

(57) ABSTRACT

In the case of disposing regions of various sizes within a page, many blank areas appear and a layout result that is visually attractive could not be obtained. Therefore the present invention determines the starting position of a new row or column, using the difference in sizes of the multiple regions disposed in each row or column.

6 Claims, 32 Drawing Sheets

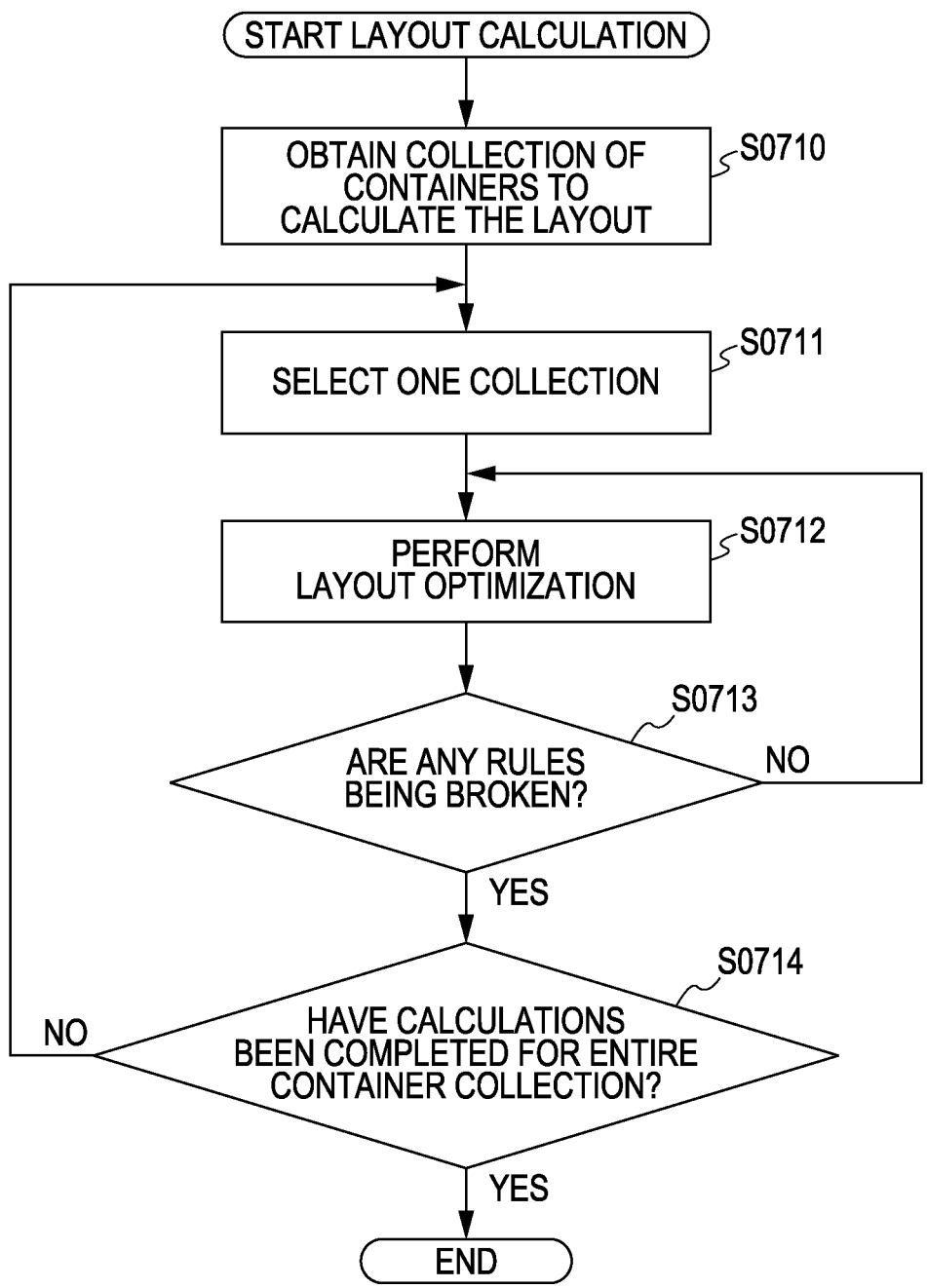

| FIG. 22A |
| FIG. 22B |

INFORMATION PROCESSING APPARATUS AND CONTROL METHOD

BACKGROUND OF THE INVENTION

1. Field of the Invention

The present invention relates to a device/medium and layout method with an automatic layout system.

2. Description of the Related Art

As product life cycles have become shorter due to product diversity and as customized services for consumers have become increasingly important due to a proliferation of Internet use, the need for CRM and One-to-One marketing has been noted in recent years. Such methods increase customer satisfaction as well as cultivate and retain customers. Note that CRM is an acronym for Customer Relationship Management.

One-to-One marketing is a type of database marketing, wherein personal attribute information such as age, gender, hobbies, preferences, purchasing history and so forth are kept in a database, and the content thereof is analyzed and proposals are provided according to the needs of the customer. Variable printing is a representative method thereof. Recently with advances in DTP (desktop publishing) technology and the increase in digital printing devices, variable printing systems which customize and output text for each customer have been developed. Of these, optimal layout of content with different sizes for each customer has become desirable.

Heretofore, a variable printing system has created a template with a container or the like on a document, and generating output material by associating the template with a database. Note that a container indicates a region wherein content data of the database is inserted. However, since the container size of the text and images has been fixed, when content data in the database is inserted into the container, in the case that the amount of data is greater than the container size, text may overlap and the images may be cut off. Also, conversely in the case that the data size is smaller than the container size, the container can result in a large amount of space therein, both situations resulting in output material that is not attractive for a user to view.

In order to solve such problems, an automatic layout system is disclosed. The automatic layout system is a technique to determine the container size according to the container size of the text or image. However, in the case that the container size is increased, there is a problem wherein the container can overlay another container in the same document. Also, in the case of adjusting the font size, in the case that the amount of text is great, there is a problem wherein the font size can become too small.

As an automatic layout technique to solve these problems, a technique is disclosed in Japanese Patent Laid-Open No. 2000-48216, wherein, in the event that the size of a certain container becomes great, the size of another container associated with the container becomes smaller.

Also, with a variable printing system heretofore, there is not only a technique to layout one record in one document, but also a technique to layout multiple records in one document. With this technique, a different number of records for each customer can be disposed on the template, thereby creating a customized document as to each customer.

In contrast with an "automatic layout technique" as described, a technique is disclosed in Japanese Patent Laid-Open No. 2006-74226 wherein a new region called a flow area is disposed on a template, and a sub-template having a form defined to serve as a basis is disposed within the flow area. Also, Japanese Patent Laid-Open No. 2006-74226 describes that the sub-template size disposed in the flow area can be changed according to the content data.

Also, a technique to dispose multiple types of sub-templates in a flow area is disclosed in Japanese Patent Laid-Open No. 2006-243805. However, as with the above-described Japanese Patent Laid-Open No. 2006-74226, if not only the container size but also the sub-template size is changed depending on the content data, sub-templates of various sizes can be disposed within the flow area.

Also, as with Japanese Patent Laid-Open No. 2006-243805, by disposing multiple types of sub-templates in the flow area also, sub-templates of various sizes can be disposed in the flow area. That is to say, when various sizes of sub-templates are lined up in order and disposed in the flow area as described above, the heights thereof are uneven, whereby blank areas can occur.

FIG. 19 will be employed to describe the above-described problems in detail. Reference numerals 1801 through 1807 described in FIG. 19 indicate a sub-template wherein content data is inserted. For example, in the case that the sub-templates to be disposed within the flow area differ as with 1801 through 1807, the sub-template disposed in the second row is disposed lower than the sub-template 1802 which has a maximum size in the vertical direction of the first row. On the other hand, if the sub-templates are disposed simply to fill in the blank areas, the starting position of the sub-template disposed on the second row becomes uneven, resulting in becoming unattractive to view.

Therefore, with the automatic layout technique heretofore, spacing as with 1808, 1809, and 1810 in FIG. 18 can occur, whereby the desire of the user to produce an output material having little space cannot be realized.

SUMMARY OF THE INVENTION

An information processing apparatus according to an aspect of the present invention includes a disposing unit configured to dispose a plurality of regions in a first row or a first column within a page; and a determining unit configured to determine a starting position for a region to be disposed in a second row or a second column, based on a difference in size between the plurality of regions disposed in the first row or the first column by the disposing unit.

Further features of the present invention will become apparent from the following description of exemplary embodiments with reference to the attached drawings.

BRIEF DESCRIPTION OF THE DRAWINGS

FIG. 6 is a flowchart describing layout calculation according to the present invention.

FIG. 19 is a diagram illustrating an example to describe an issue which the present invention deals with.

FIG. 21 is a diagram illustrating an example to describe an issue which the present invention deals with.

DESCRIPTION OF THE EMBODIMENTS

Figure 1:
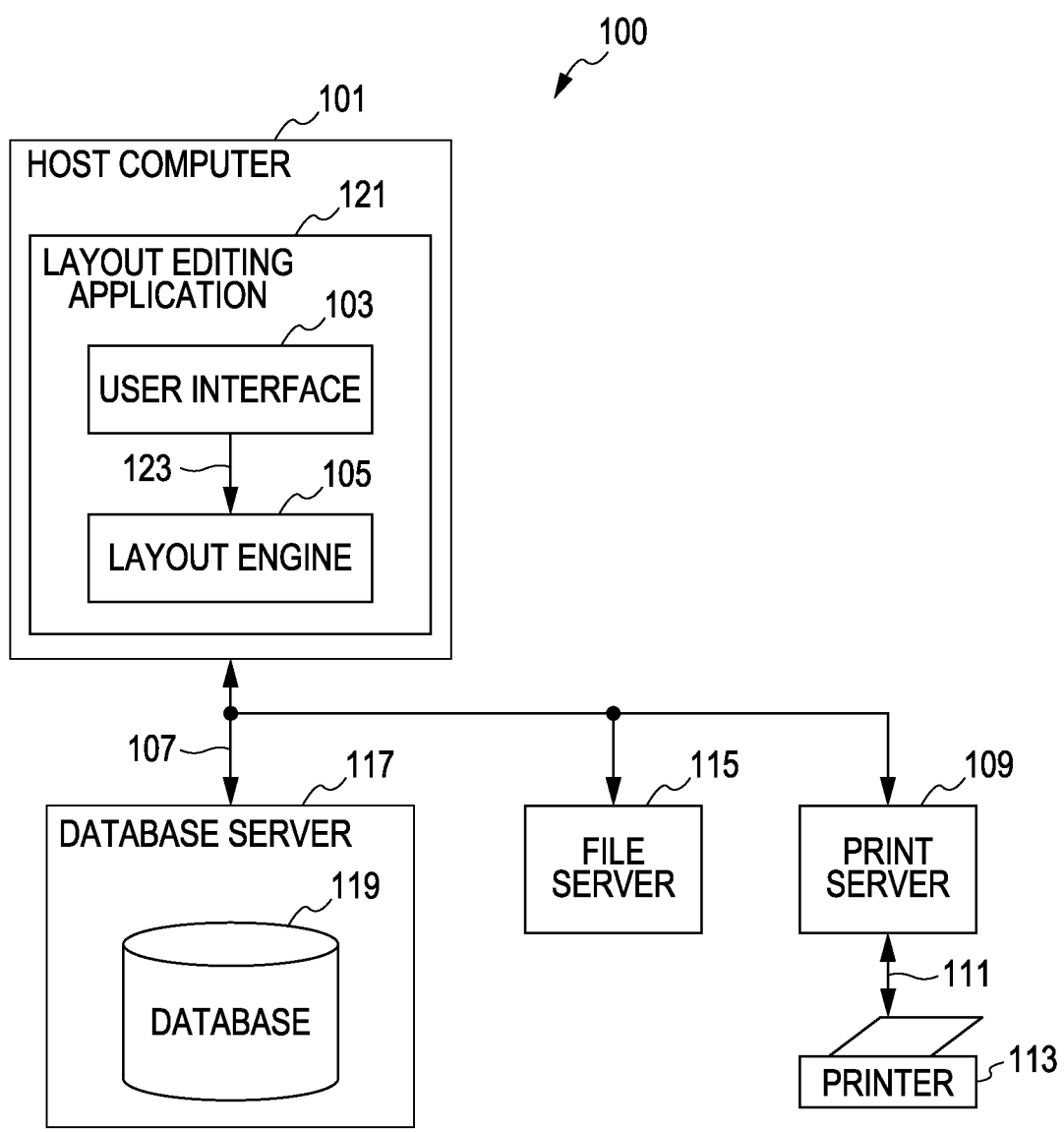
FIG. 1 is a configuration diagram of a computer system according to the present invention.
Figure 2:
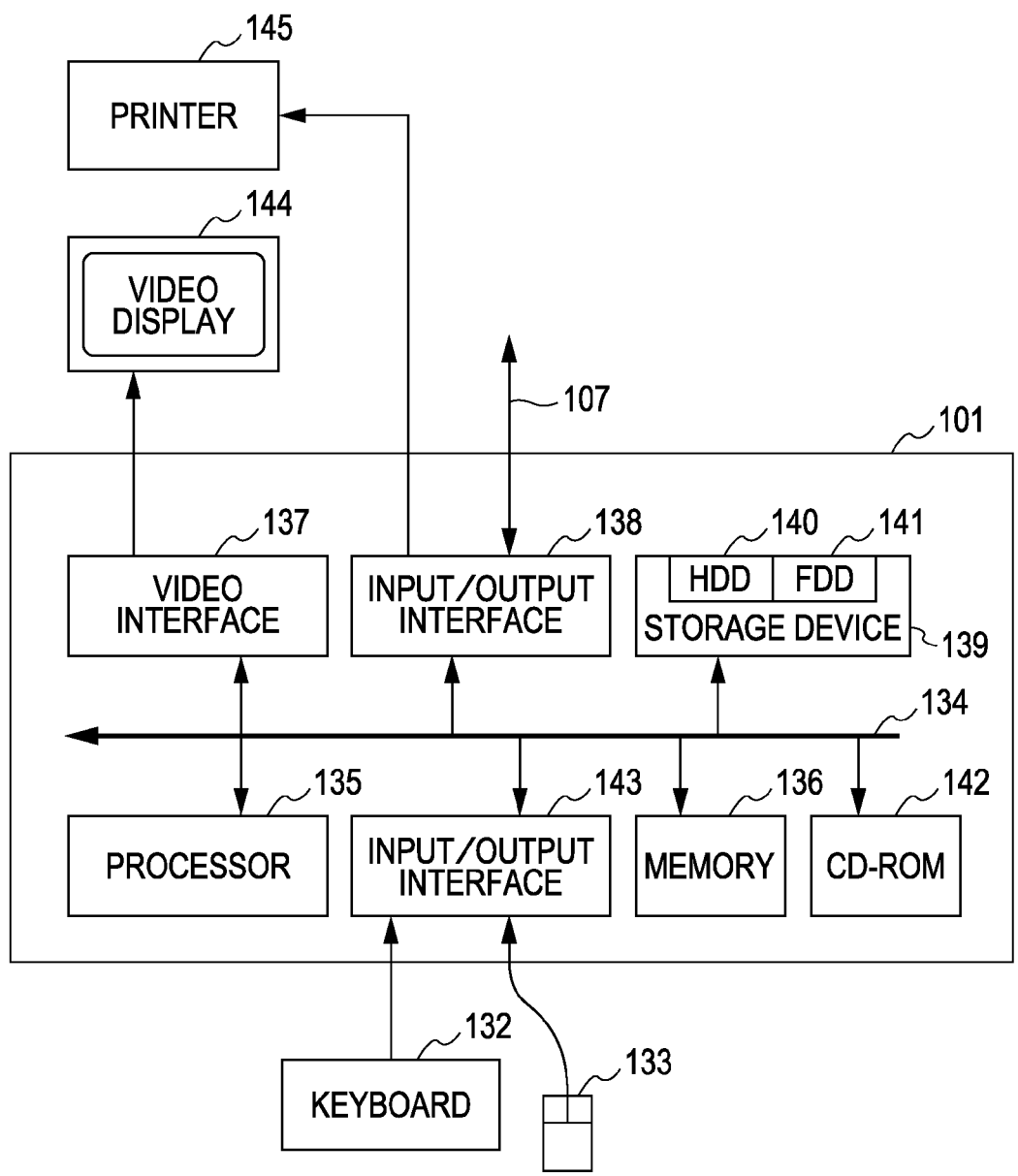
FIG. 2 is a schematic diagram of a computer module according to the present invention.

Some embodiments will be described for applying the embodiments of the present invention. Prior to describing the embodiments of the present invention, the system configuration and application configuration to which the present invention can be applied will be described.
System Configuration FIG. 1 shows a system 100 to print a variable data document. The technique described first is realized with a general-use computer 101 (information processing apparatus) described in detail with reference to FIG. 2.

A processing process described with the present application is executed with all or a portion of a software as with a layout editing application program 121 which can be executed within the computer 101 and performed on the system 100. In particular the layout editing and printing processing is executed with instructions of the software of the computer 101. The software is stored in a computer readable medium including a storage device such as that described below, for example. The software is loaded from the computer readable medium to the computer, and is executed with the computer 101. By using a computer program product with the computer, document layout editing and variable data printing can be executed.

The computer 101 is connected to input devices such as a pointing device such as a keyboard 132 and mouse 133, and output devices including a display device 144 and local printer 145.

An input/output interface 138 is employed to link the computer module 101 from a network connection 107 to other computer apparatuses. A typical network connection 107 is a local area network (LAN) or a wide area network (WAN).

The computer 101 typically has at least one processor unit 135 and a memory unit 136 such as a random access memory (RAM), e.g. a semiconductor, or read-only memory (ROM). Also, the computer 101 includes an input/output interface to include a video interface 137 and an input/output interface 143 for the keyboard 132 and mouse 133.

The storage device 139 typically includes a hard disk drive 140 and floppy (registered trademark) disk drive 141. Although not shown in the diagram, a magnetic tape drive and so forth may also be used. A CD-ROM drive 142 is provided as a non-volatile data source.

The computer 101 uses components 135 through 143 via an operating system such as LINUX or Microsoft Windows (registered trademark) or a interconnection bus 134. The layout editing application 121 shown in FIG. 1 is typically resident on the hard disk drive 140, and is executed with the processor 135.

The data which is fetched from the intermediate storage device of the layout editing application 121 and the network 1020 uses the semiconductor memory 136 in concord with the hard disk drive 140. With several examples, the layout editing application 121 is encoded on a CD-ROM or floppy (registered trademark) disk, read in through the corresponding drive 142 and 141, and is provided to the user.

Also, the layout editing application 121 may be read in by the user from the network connection 107. Further the layout editing application 121 may be installed in the computer 101 via a magnetic tape, ROM, integrated circuit, optical magnetic disk, wireless, infrared communication, computer-readable card such as a PCMCIA card, and email.

Also, the layout editing application 121 may be loaded into the computer module 101 from another computer-readable medium of an appropriate size, including the Internet or an intranet, having recording information on a website. The layout editing application 121 in FIG. 1 includes two software components.

The first component is a layout engine 105. The layout engine 105 executes processing to determine the layout processing on the template using restriction information or the like set by the user. The second component is a user interface 103. The user interface 103 provides a function for the user to create a document template, a function to associate a document template and a data source, and so forth.

The user interface 103 and layout engine 105 communicate via a communication channel 123. The data source used for generating a document is the database 119 stored in a database server 117, for example. The host computer 101 uses the network connection 107 to obtain data from the database server 117.

The layout editing application 121 uses a document template saved in a file server 115 made up of the host computer 101 or generally another computer. Also, the layout editing application 121 generates a document for outputting by merging the data obtained from the database server and the document template. These documents are saved in the local file system of the host computer 101, saved in the file server 115, or printed with the printer 113.

The print server 109 provides a network function to a printer not directly connected to the host computer 101. The print server 109 and printer 113 are connected via a typical communication channel 111. Note that the layout engine 105 executes processing, not only in the host computer, but also in an engine server which is another information processing apparatus.

Figure 31:
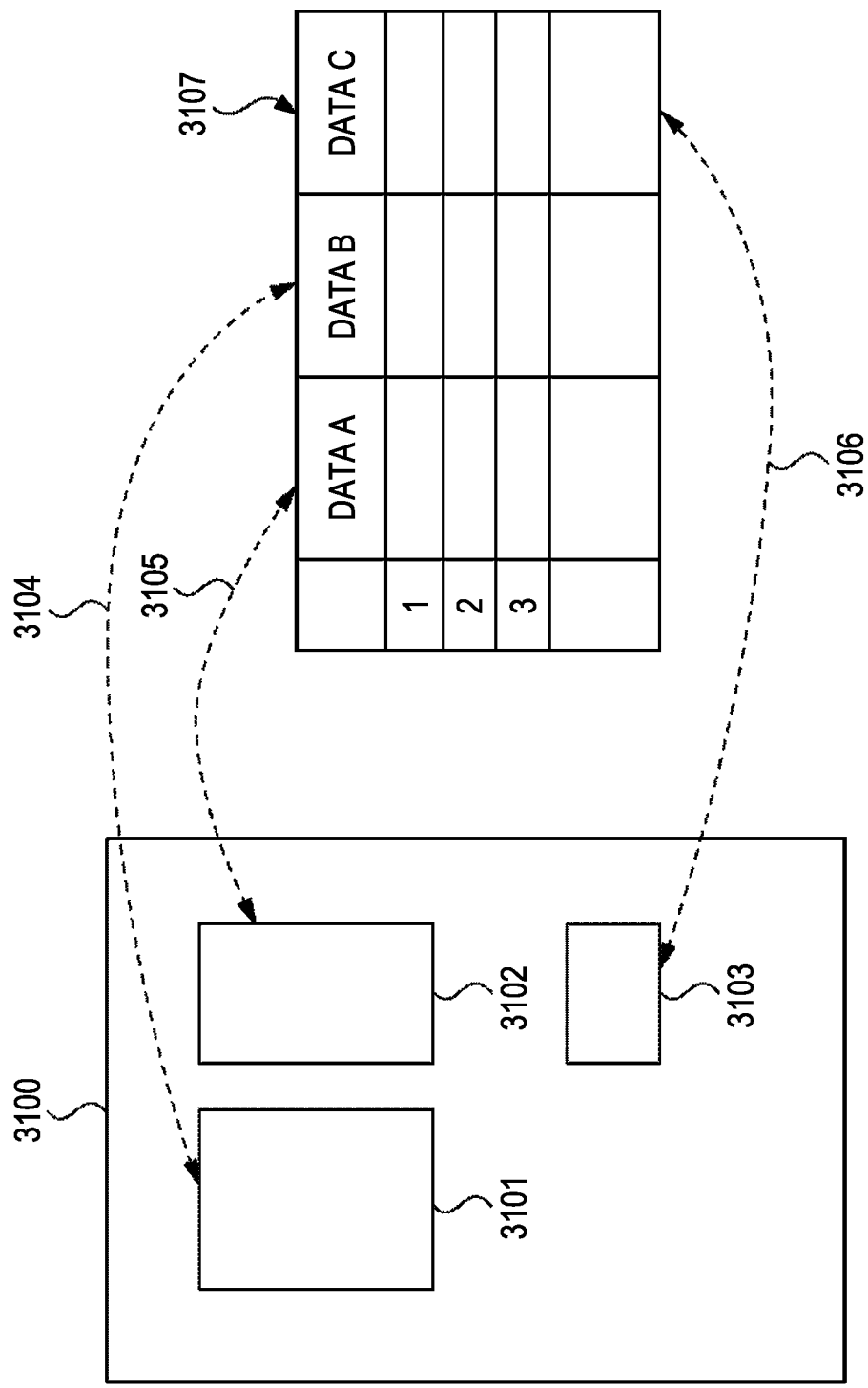
FIG. 31 is a diagram to describe an example of a variable printing concept.

FIG. 31 is a diagram describing the schematics of variable data printing according to an embodiment of the present invention. The layout editing application 121 disposes multiple containers 3101 through 3103 on a page according to operating instructions from a user, and generates a document template 3100 by adding regulating conditions relating to position and size for each container.

Also, the layout editing application 121 performs association of the document template 3100 and data source 3107, and further association with each container and each data field within the data source 3107 (3104 through 3106). The associated information indicating association with each container and each data field within the data source 190 is written in the document template and stored in the memory unit 136. Also, the data source 3107 is a file wherein item data is written in increments of records.

The layout engine 105 reads in data associated with the associated information from the data source 3107 into each container 3101 through 3103 of the document template, according to printing instructions or preview instructions from the user, and inserts this in increments of records. For example, data fields A through C of record 1 is inserted into the containers 3101 through 3103. Each container size is adjusted (layout adjustment) according to the data inserted.

An arrangement may be made wherein the data source (3107) for generating a document is a general-use database 119 on a database server 117 configured with another computer operating the database application, for example. In this case, the host computer 101 can communicate with the database server 117 via the network 107 and obtain data source.

Application Configuration Diagram

Main Window

Figure 3:
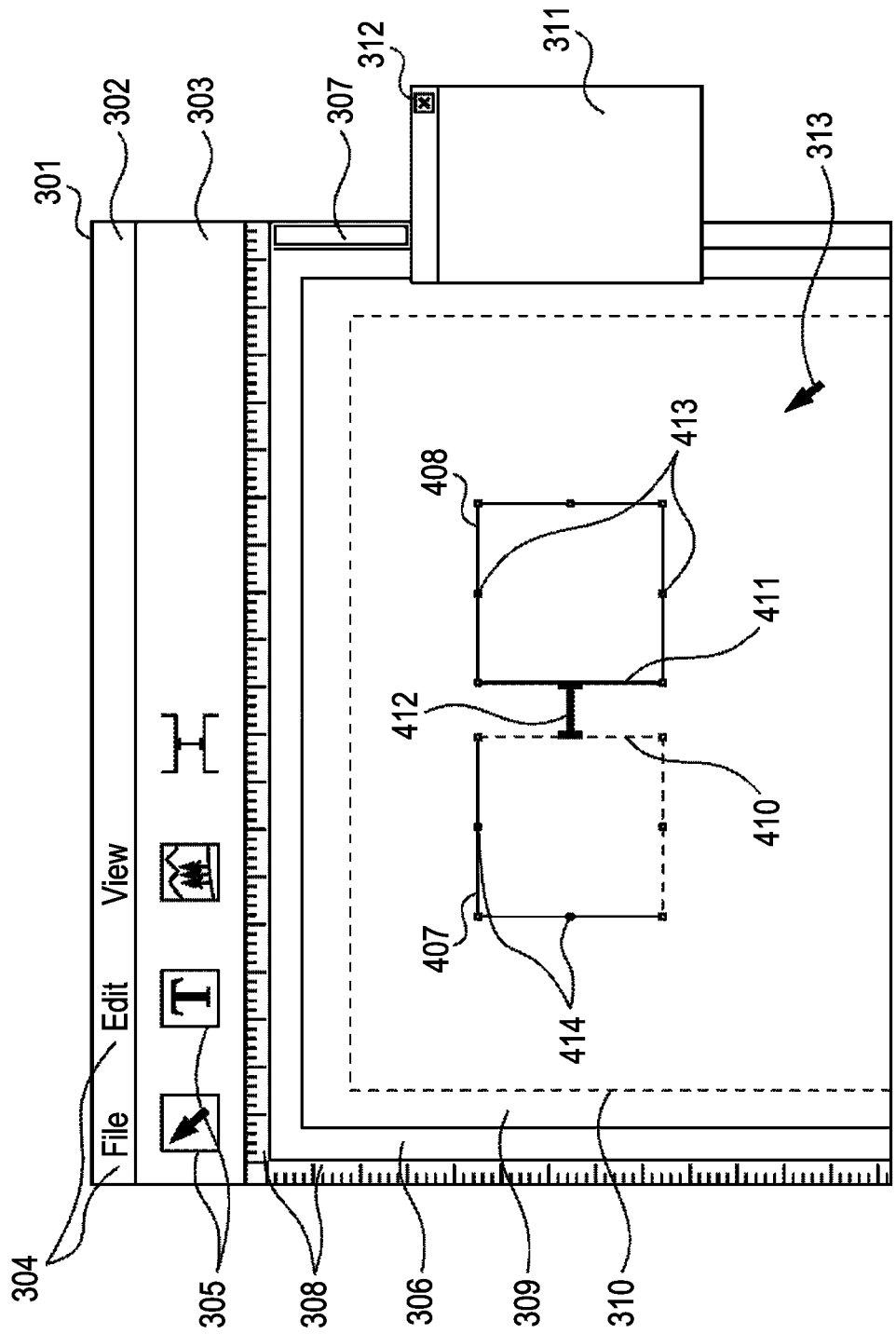
FIG. 3 is an aspect of a typical container having a link between a container and a main window of a typical application including a menu bar, tool bar, work are, and floating palette according to the present invention.

As shown in FIG. 3, the user interface 103 displays an application window 301 which is displayed on a video display 144 at the time of operation. The application window 301 has a menu bar 302 and tool bar 303, a work area 306 of which the location is movable by positioning and moving the mouse 133, and an option palette 311. Note that a cursor/pointing device 313 is moved by an input device such as a mouse.

The menu bar 302 is conventionally known, and has many menu items 304 which can be expanded under a menu option hierarchy. The tool bar 303 has many widgets 305 such as tool buttons which can be displayed or not displayed according to a specific mode by the application. A ruler 308 in the options is used to indicate the position of a pointer, page, line, margin guide, container, or object within the work area.

The palette 311 is used to access added functionality such as a library which read is and displays variable data. The palette 311 has a window control 312 to move, resize, and close the window.

The tool bar 303 has at least the following user-selectable "buttons".

Selection tool button: used to select, move, change size, resize, and lock/unlock the container sides. The user drags the selection box around multiple containers or instructs multiple containers in a state of continually pressing the CTRL key, whereby multiple containers can be selected.

Image container tool button: used to create a container (partial region) into which image data is input.

Text container tool button: used to create a container (partial region) into which text data is input.

Link tool button: used to set the distance between containers.

Document Template

The work area 306 is used to display/edit document template designs. Thus a user can have a document overview and understand how a merged document changes based on the amount/size of content data (variable data).

In the case that a database is associated with a template, the layout editing application 121 displays the output results of the content data (text data, image data) being input in a container of the template. Thus, the user can confirm the content of a current document. Visual clues to depict the document configuration and the variable data container are displayed when moving the cursor over the container or when selecting the container.

The work area 306 includes a scroll bar 307, ruler 308, and template 309 which is created by the user. The template 309 can indicate that there are multiple pages within the template.

The page size of the provided document template is specified by the user using known techniques. The actual number of pages in each document may change according to the variable data. There may be cases wherein the data does not fit within one page, whereby an additional page is automatically created. The border lines within each page are arbitrary page margins 310 which indicate the maximum width of an object that can be printed on the page.

Also, FIG. 3 includes an example of objects that can be displayed on the one-page template 309. Examples of such objects are the multiple containers 407 and 408, an edge not fixed 410, fixed edges 411, 413, and 414, and a link 412.

Container

A container is a region that is disposed within the document template and into which content data is input. The layout editing application 121 uses the restriction information set in the template, the size of the content data input in the container, and so forth to determine the size and position of the container. The container can be generated, moved, and resized by drawing a rectangle using the pointing device 313 for example. Note that the user is enabled to set desired restriction information as to the container. Fixed or variable content data is input in the container. Variable content data indicates data that differs in increments in records even if the same item.

On the other hand, fixed content data indicates the same data for the same item of multiple records. This is displayed the same for all documents generated using the container.

The container has text attributes set such as background color, borders, font styles and so forth to be applied to the content. Note that the content data input in the content is output (printed, displayed, etc) after the later-described layout editing processing is executed.

Restriction information that is set as to the content is displayed. However, basically the restriction information is not printed. The user interface 103 displays several ornamental functions such as background color or font.

Container Restrictions

Restriction conditions to be applied at the time of layout are set as to the container. An example of such restriction conditions may be "the height of this container is maximum value 4 inches", "the left edge of the container is fixed", and so forth.

The content described below is a method to display and edit such restriction conditions using a GUI. Similar to an image having a defined position on the page, a content placeholder to specify the disposal of the fixed content is often used in digital printing techniques. A container has a position and size, which are edited and displayed with known methods. The user can specify the size/position on the template as to the container.

Container Display/Editing

New Container Creating Method

There are two types of containers including a text container and an image container. Text data is input in a text container and on the other hand, image data is input in the image container. A new text container and image container are generated on a template 309 by using a mouse 133 to generate a rectangle after a text or image content tool button of the widget 305 is selected.

Also, an arrangement may be made wherein a container is simply created by clicking on the document template 309 after similarly activating a container tool button. In this case, either a default size container is created, or a dialog box is provided to input the dimensions of a new container.

Display Method of Container

A container edge is to define a virtual border in the case of displaying the associated content within a document. In the case of employing a container as a user interface, for example a container left edge is handled as a far left edge wherein the associated content can be displayed in the document. Similarly, the container height is a height limit wherein the associated content can be displayed with the generated document. The present application has a premise of being able to set the edge or size of the container using the user interface 103.

Several rules defining the relation between the user interface and the layout which are used to restrict the content layout are described below. In the case that the left and right edges of the container are solid lines, the width of the container is fixed. If the container width is fixed, the width to be allocated to the associated content becomes the same for all records. However, the height of the container may change for each record.

In the case that the upper and lower edges of the container are solid lines, the height of the container is fixed. If the container height is fixed, the height to be allocated to the associated content becomes the same for all records. However, the width of the container may change for each record. If the distance restriction is fixed, the specified distance becomes the same for all of the documents.

In the case of associating another container to the solid line edges of the container, there may be cases wherein the container is pressed by another container and changes position. The restrictions as to the upper and lower edges bring about positional changes in the vertical direction, and the restrictions as to the left and right edges bring about positional changes in the horizontal direction.

The opposite of "fixed" is "variable", which means that the edges, position, or document restrictions may change for the entire document. An example of a user interface to realize variability is described below. If the left and right edges of the container are dotted lines, the container width is variable. If the container width is variable, the width allocated to the associated content changes for each record. If the upper and lower edges of the container are dotted lines, the container height is variable. If the container height is variable, the height allocated to the associated content changes for each record.

If the distance restriction is variable, there is a possibility of the specified distance changing for each record. With the settings as to the distance restriction, a layout to adjust the container distance can be performed within the restrictions of maximum length and minimum length.

If another container is associated with the dotted line edge of a certain container, there may be cases wherein the container thereof is pressed by the associated other container, and the position is changed. The restrictions as to the upper and lower edges bring about positional changes in the vertical direction, and the restrictions as to the left and right edges bring about positional changes in the horizontal direction.

The restriction conditions (variable, fixed, minimum value/maximum value of width/height) set as to the container are displayed on the video display 144.

Link Setting Method

Figure 4A:
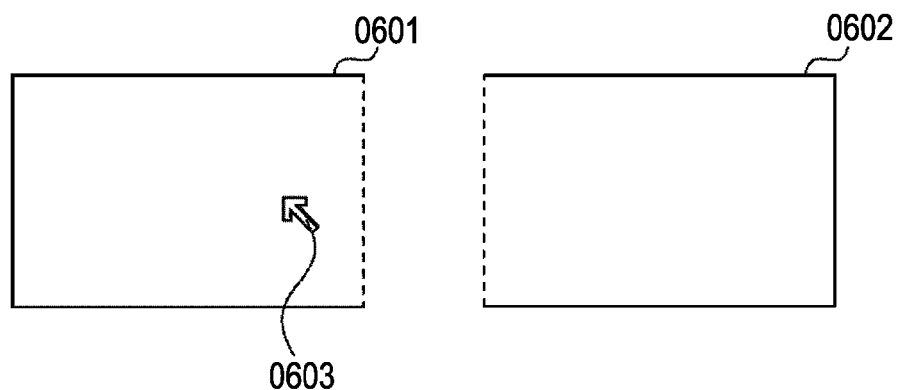
FIGS. 4A to 4C are an example of a user interface to create a link according to the present invention.
Figure 4B:
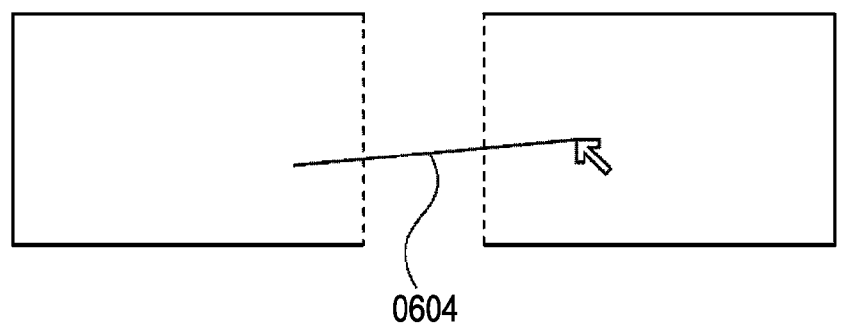
Figure 4C:
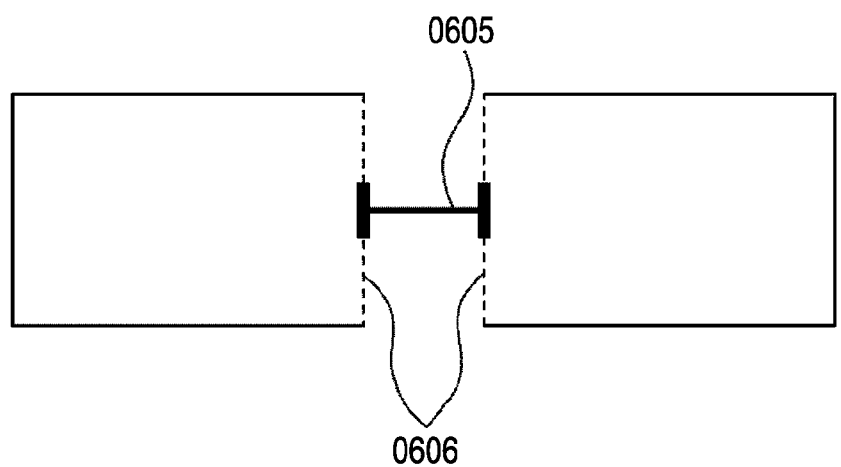

FIGS. 4A to 4C show an example of a user interface of a link setting method. In order to set the link, a container (minimum of two) is created for linking with the link. FIGS. 4A to 4C show an example in the case of creating two containers and setting a link. Next, the above-described link tool is selected. FIGS. 4A to 4C show an operation to set a link from a state of creating a container and selecting the link tool. This will be described in order of FIGS. 4A through 4C.

Reference numerals 0601 and 0602 in FIG. 4A denote containers. Reference numeral 0603 denotes a mouse pointer. First, a container on one side setting the link is clicked and selected. Next as shown in FIG. 4B, the mouse pointer is moved to the container on the other side, and clicked. Reference numeral 0604 of FIG. 4B denotes a line linking the position clicked in FIG. 4A and the moved mouse pointer, and is a user interface showing the user in which position the link is set.

Upon the second click in FIG. 4B ending, the link user interface denoted by reference numeral 0605 in the set location is displayed, and the container becomes in the state of FIG. 4C.

Reference numeral 0606 denotes an edge shown with a dotted line, and shows a variable edge. With the template in C in FIG. 4, the right edge of the left container 0601 moves according to insertion of the content data. Also, the left edge of the right container 0602 moves according to insertion of the content data. By connecting the containers with a link in between, the left and right containers can be adjusted to change the mutual sizes thereof while maintaining the distance between.

Layout Calculation Method (Overall Flow)

Figure 5:
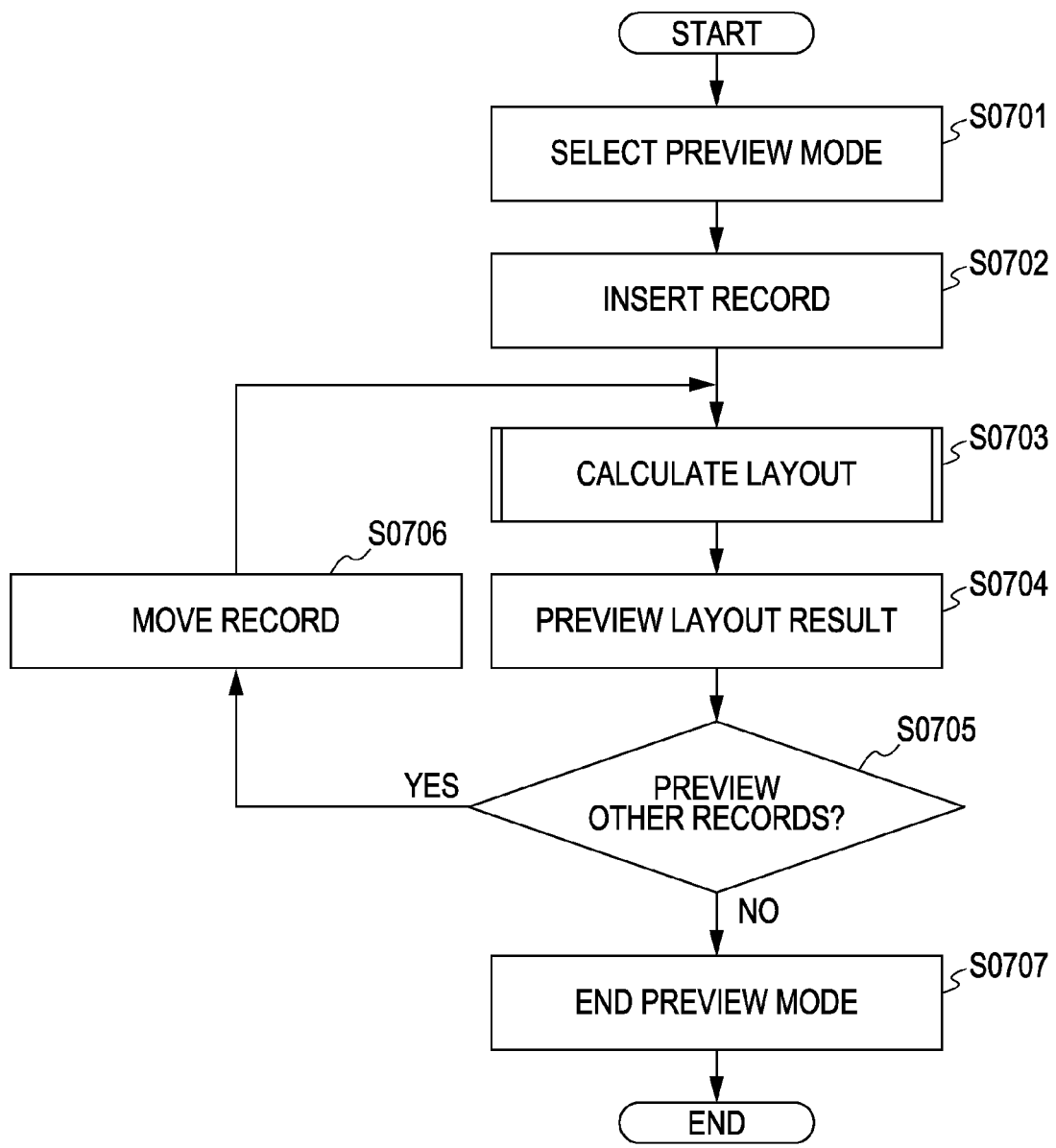
FIG. 5 is a flowchart describing layout calculation according to the present invention.

FIG. 5 Shows a flowchart of a layout calculation. First, the layout editing application 121 selects a preview mode (S0701). The layout editing application 121 has a template creating mode to execute processing such as creating multiple containers on the template and associating the multiple containers with a link therebetween. Also, the layout editing application 121 has a preview mode to insert content data included in the database record as to the template container and preview the layout results after the content data is inserted in the container. With the preview mode, the layout editing application 121 executes layout processing based on actual records. The preview mode is a layout calculation for the display, but the same processing is executed in the case of printing.

In the case that the preview mode is set in S0701, the layout editing application 121 inserts the content data included in a record to be previewed into each container (S0702), and executes layout calculation (also called layout processing) (S0703). The layout editing application 121 displays the layout results obtained in S0703 (S0704).

In the case that preview is selected for other records (Yes in S0705), the layout editing application 121 selects the other record selected by user input (S0706), and executes layout calculations. On the other hand, in the case that preview is not selected for other records (No is S0705), the preview mode is ended (S0707). At the time of printing instead of preview mode, layout calculations are performed for the record to be printed. Accordingly, S0705 and S0707 do not exist. At the point-in-time that printing is ended for all of the records, the processing is ended.

Layout Calculation Method

Figure 8:
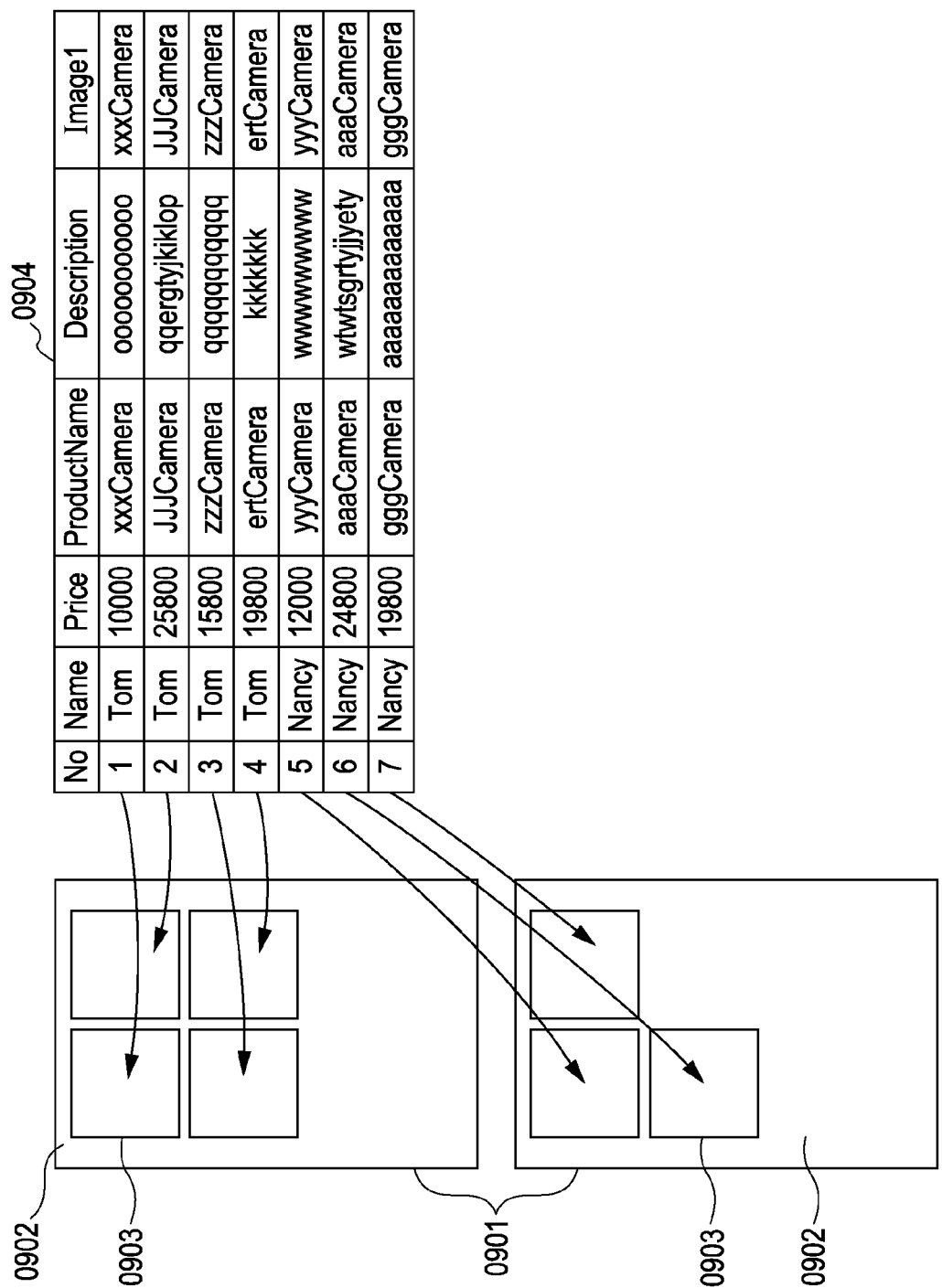
FIG. 8 is a schematic diagram of a multi-record according to the present invention.

FIG. 6 is a flowchart describing details of the layout calculation in S0703 in FIG. 5. Also, FIG. 8 is a diagram showing a user interface display example of a layout calculation.

The layout editing application specifying groups of containers disposed within the template (S0710). Note that groups of containers are multiple containers linked with a link. The layout calculation is executed as to the group of containers associated with the link.

Next, the layout editing application 121 selects one group for calculating the layout (S0711) from the group of containers specified in S0710, and performs layout calculations for the selected container group.

The layout editing application 121 performs layout optimization so that the size of the container for layout (content data) has a difference as small as possible with the actual content data size (S0712). An example of optimizing a layout is executed such that the difference between the content size inserted in each content and the size of the layout result is the same for each container associated with a link. That is to say, calculations are performed such that the difference between the size of content data inserted in the container 808 in FIG. 7 and the size of the content data after calculation becomes the same as the difference between the size of content data inserted in the container 809 and the size of content data after calculation.

In the case that layout optimization is performed and a rule has been broken, the layout editing application 121 calculates so that the rule will not be broken again (S0713). The rule mentioned here is a restriction condition set by the user at the time of layout creation, and may be a container size and position, state of edges, length of link, and so forth. Upon calculations for the layout performed so that the rules will not be broken, the layout of such group is completed. The steps in S0711 through S0713 are performed for all of the groups on the page, and the layout for the entire page is calculated (S0714).

Figure 7A:
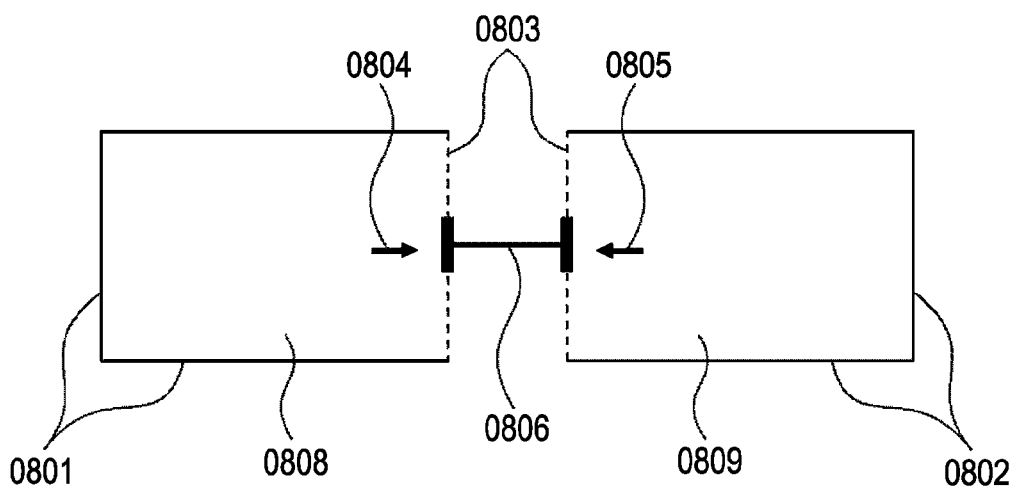
FIGS. 7A to 7C are an example of a user interface corresponding to the flow in FIG. 6 according to the present invention.
Figure 7B:
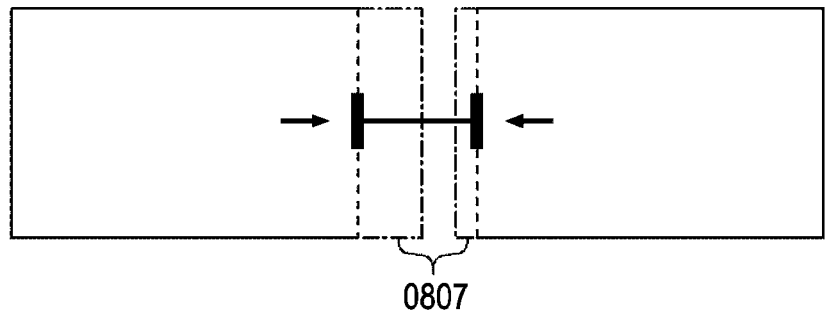
Figure 7C:
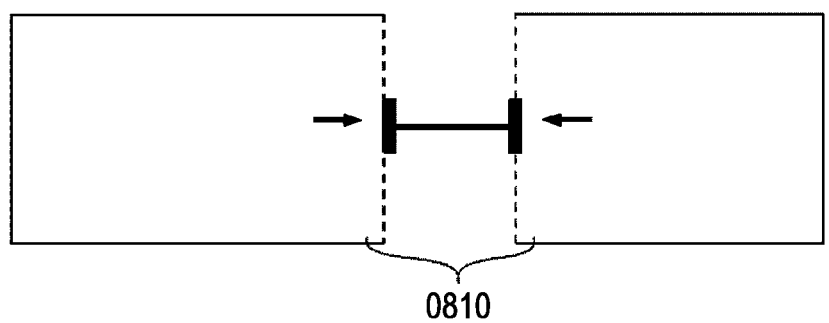

FIGS. 7A through 7C show an example of a user interface at the time of layout calculations.

FIG. 7A shows a state wherein content data of a certain record is inserted and the layout is determined. Reference numerals 0801 and 0802 denote fixed edges, 0803 denotes a variable edge, 0804 and 0805 denote arrows showing the direction of change for the variable edges, and 0806 denotes a link. Reference numerals 0808 and 0809 denote a container. In this state, the layout editing application 121 changes the record and inserts content data of different sizes in each container.

FIG. 7B shows a new content data size layered on the state of FIG. 7A. Reference numeral 0807 expresses the content data size inserted in each container. The layout calculations are then performed. FIG. 7C shows results of layout calculations. The various container sizes after calculations are calculated such that the difference between the size of content data to be inserted in the left container and the size of container after layout calculations is the same as the difference between the size of content data to be inserted in the right container and the size of container after layout calculations. These differences need to satisfy the restriction conditions as described above.

As shown in FIG. 7C, the inserted content size (0807) as shown in FIG. 7B and the content size after calculation (0810) both have similar differences.

Multi-Records

An overview of multi-records will be described. FIG. 8 is a diagram showing an overview of a multi-record and the layout method thereof. Reference numeral 0901 denotes a document, 0902 denotes a page, 0903 denotes a sub-template, and 0904 denotes a database. Viewing the database denoted with 0904, data of No. 1 through No. 7 are displayed. Note that the data lined up in the horizontal direction in the database 0904 is content data, and an group of multiple content data becomes one record. That is to say, record 1 includes the content data "Tom", "10000", "xxx Camera" and so forth. In the case of executing variable printing to create one document for one record, in FIG. 9 seven records are held in the database so seven documents are created.

However, with variable printing that executes multi-record function creating one document from multiple records, processing such as the following is performed. First, the user arbitrarily specifies a column specifying a multi-record. In this example, the field name: Name is specified. Records having the same field name are understood to be records laid out in one document. In this example, the records No. 1 through 4 have the Name as Tom, and records 1 through 4 are disposed on the first page, while records 5 through 7 are disposed on the second page.

Setting Flow in Flow Area

Figure 9:
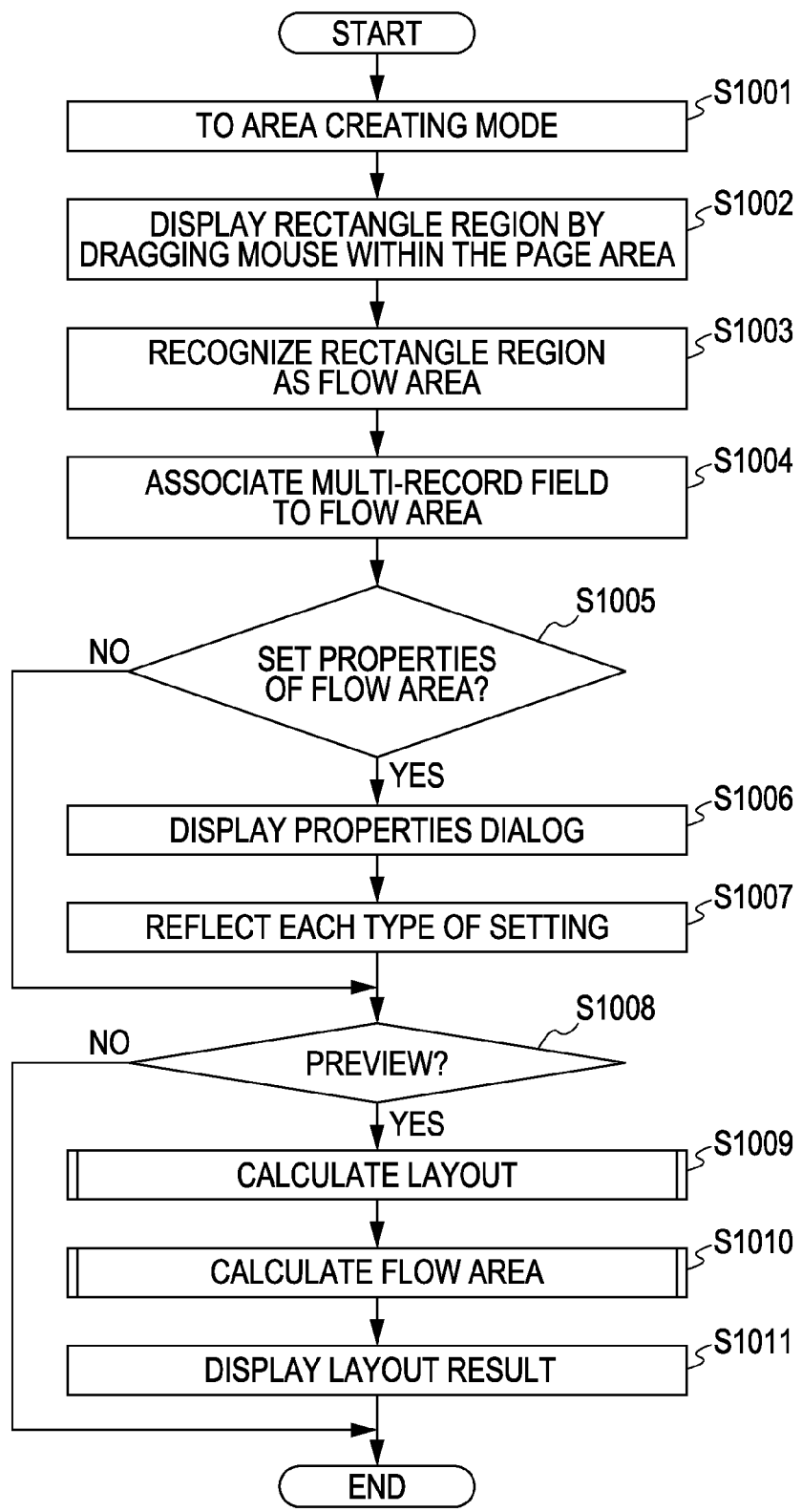
FIG. 9 is an overall flowchart describing flow area processing according to the present invention.

FIG. 9 is a flowchart showing how to execute a multi-record function in a variable printing system according to an embodiment of the present invention. The layout editing application 121 selects an area creating mode (step S1001) based on user operation. The processing in S1001 is realized by the layout editing application 121 recognizing the selection of an area creating tool button 1103 on the application window 1101 in FIG. 10, for example.

Figure 10:
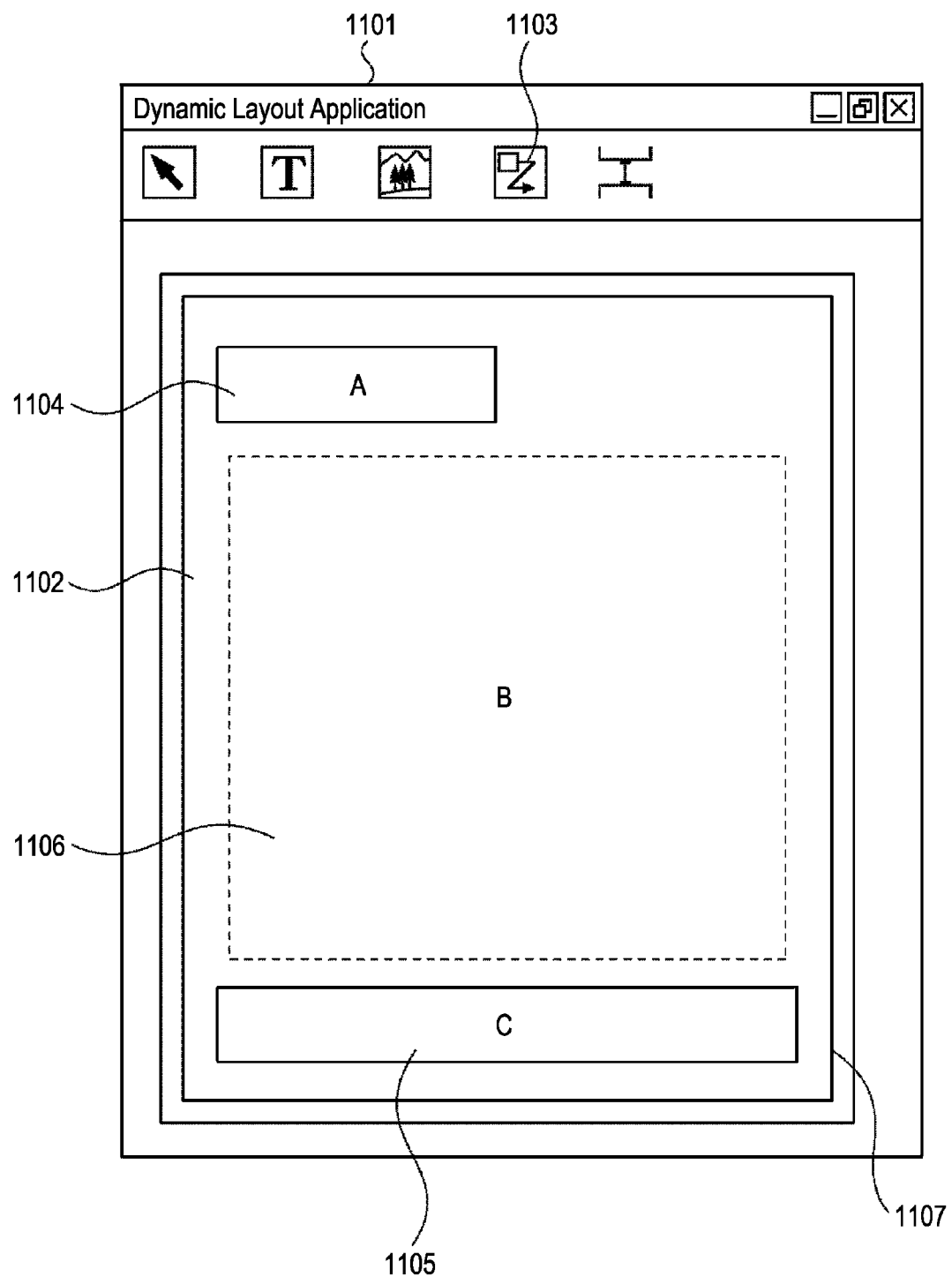
FIG. 10 is an example of a user interface of a flow area according to the present invention.

Next, the layout editing application 121 draws and displays a rectangular region 1106 based on a dragging operation of the mouse 133 in the page area 1107 (step S1002). The drawn rectangular region 1106 is recognized as a flow area (step S1003). In FIG. 10, there is one flow area, but an arrangement may be made wherein multiple flow areas are set. Also, 1104 and 1106 in FIG. 10 denote the above-described containers. Note that the flow area causes the rectangular user interface such as the color, line type, and so forth to differ from the containers thereof, thereby enabling the user to visually recognize the flow area. That is to say, the flow area is displayed so as to be distinguishable from the container.

Next, the layout editing application 121 associates a multi-record field to the created flow area (step S1004).

Next, the layout editing application 121 determines whether or not there are any settings for flow area properties as to the created flow area (step S1005). In the case that there is no setting operation (NO in step S1005), the flow is advanced to step S1008. On the other hand, in the case that settings are specified (YES in step S1005), the flow is advanced to step S1006. Note that the setting operations are realized by clicking the flow area subject to setting operations with a mouse pointer or the like, for example.

In the case that setting operations are instructed, the layout editing application 121 displays a flow area setting dialog 1201 (FIG. 11) (step S1006), and reflects the various settings on the flow area based on setting content to the flow area setting dialog (step S1007).

The layout editing application 121 determines whether or not there are any document preview 1102 operations (step S1008). In the case there are no preview operations (NO in step S1008) the processing is ended. On the other hand, in the case there are preview operations (YES in step S1008), the flow is advanced to step S1009.

Next, the layout editing application 121 obtains content data from a database, inserts the obtained content in each container (e.g. 1104, 1105) and executes layout calculations, and confirms the container position and size (step S1009).

Next, the layout editing application 121 executes layout calculations for the set flow area (step S1010). The layout editing application 121 sets extracting conditions and multiple types of sub-templates to be described later with reference to FIG. 14 and so forth in the flow area. Records including content data satisfying the extracting conditions are obtained from the database, and the sub-template to be used for each record is specified using the content data and usage conditions for each sub-template. The layout editing application 121 executes layout processing to be described later with reference to FIG. 13 using the content data for the obtained first record and the sub-template specified for the first record. In step S1010, the above-described processing is repeatedly executed for the obtained multiple records.

The layout editing application 121 outputs (preview, printing, etc) the layout results subjected to layout calculations (step S1011).

Property Setting Flow

Figure 11:
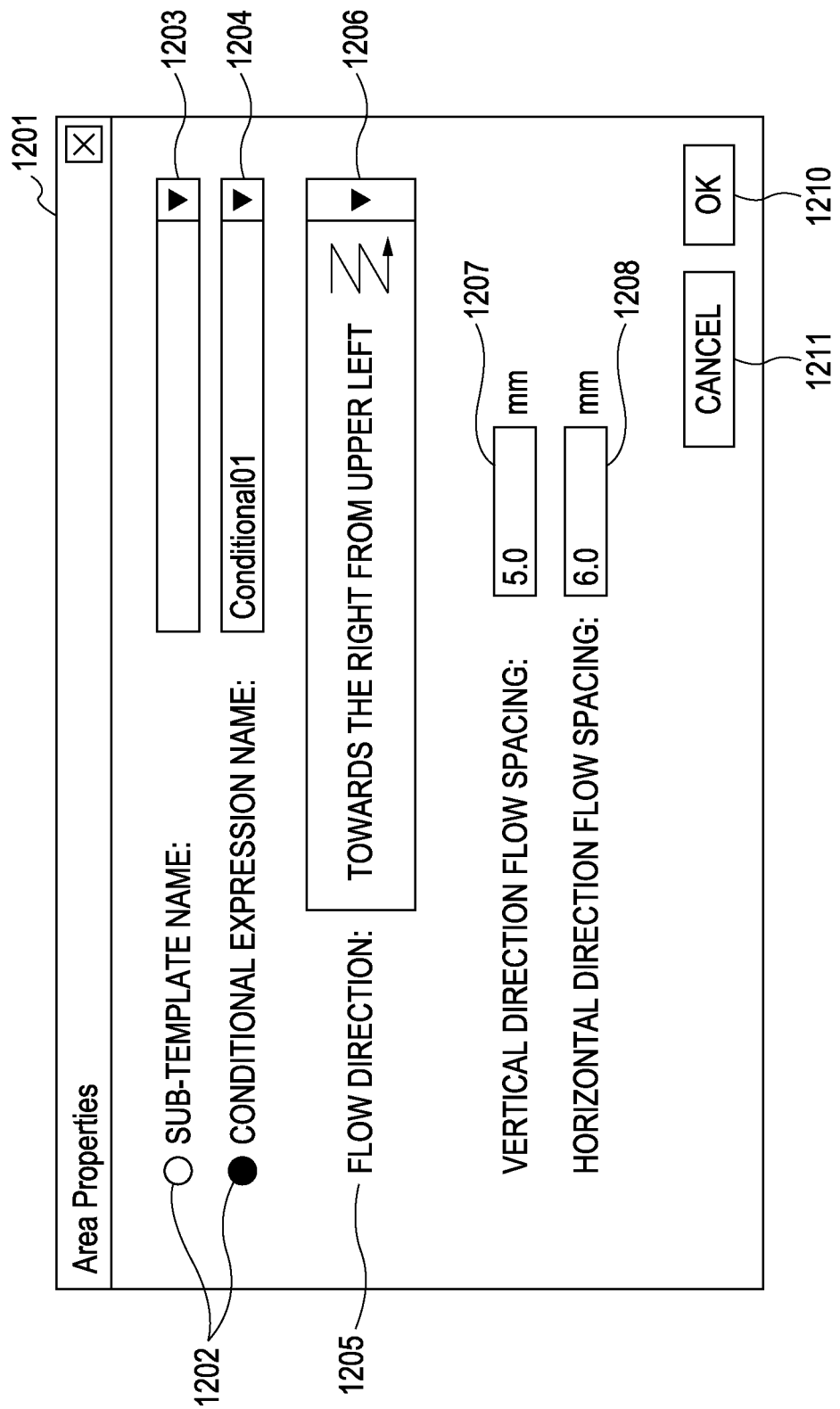
FIG. 11 is an example of a user interface for a setting dialog of a flow area according to the present invention.

FIG. 11 shows an example of a setting dialog to perform various types of settings (property settings) of the flow area. The setting screen in FIG. 11 is displayed in S1006 in the above-described flowchart in FIG. 9, and the content thereof is reflected as to the flow area in S1007. Note that the sub-template and conditional expressions in the document will be described later.

The user selects a radio button 1202, whereby the layout editing application 121 selects whether the content to be set as to the flow area is a sub-template or a conditional expression. In the case that a setting of a sub-template is selected, the layout editing application sets the sub-template selected from the list box 1203 as to the flow area.

On the other hand, in the case that a conditional expression is selected, the layout editing application 121 sets the condition selected from the list box 1204 as to the flow area. Note that the conditional expression set as to the flow area is a condition in order to extract the records to be disposed on the flow area from the database, and therefore may be called an extracting condition.

The sub-template and conditional expression can be set within the document template during editing, each with particular user interface methods. However, an arrangement may be made with another method wherein the sub-template and conditional expression are saved in another file and can be selectively specified by specifying the file from the setting dialog. With the present embodiment, multiple sub-templates and conditional expressions can be created, but also based on the feature of selecting from a list box, each sub-template and conditional expression can have a unique name so as to be distinguished.

Also, the disposal direction 1205 in the event of disposing a sub-template is selected from the list box 1206 from the present setting dialog, and the spacing between the sub-templates are set with vertical spacing 1207 and horizontal spacing 1208. As a flow direction that can be selected from a dropdown list 1206, the direction may be from left to right, from upper left towards the right, and from upper right towards the left. Note that the types of directions are not to be limited to the directions listed here, and an arrangement may be made to have other types at any time.

An OK button 1210 is pressed to confirm the above-described settings. First, upon the cancel button 1211 being pressed, the various specified settings are all cancelled.

Sub-Template

Figure 12:
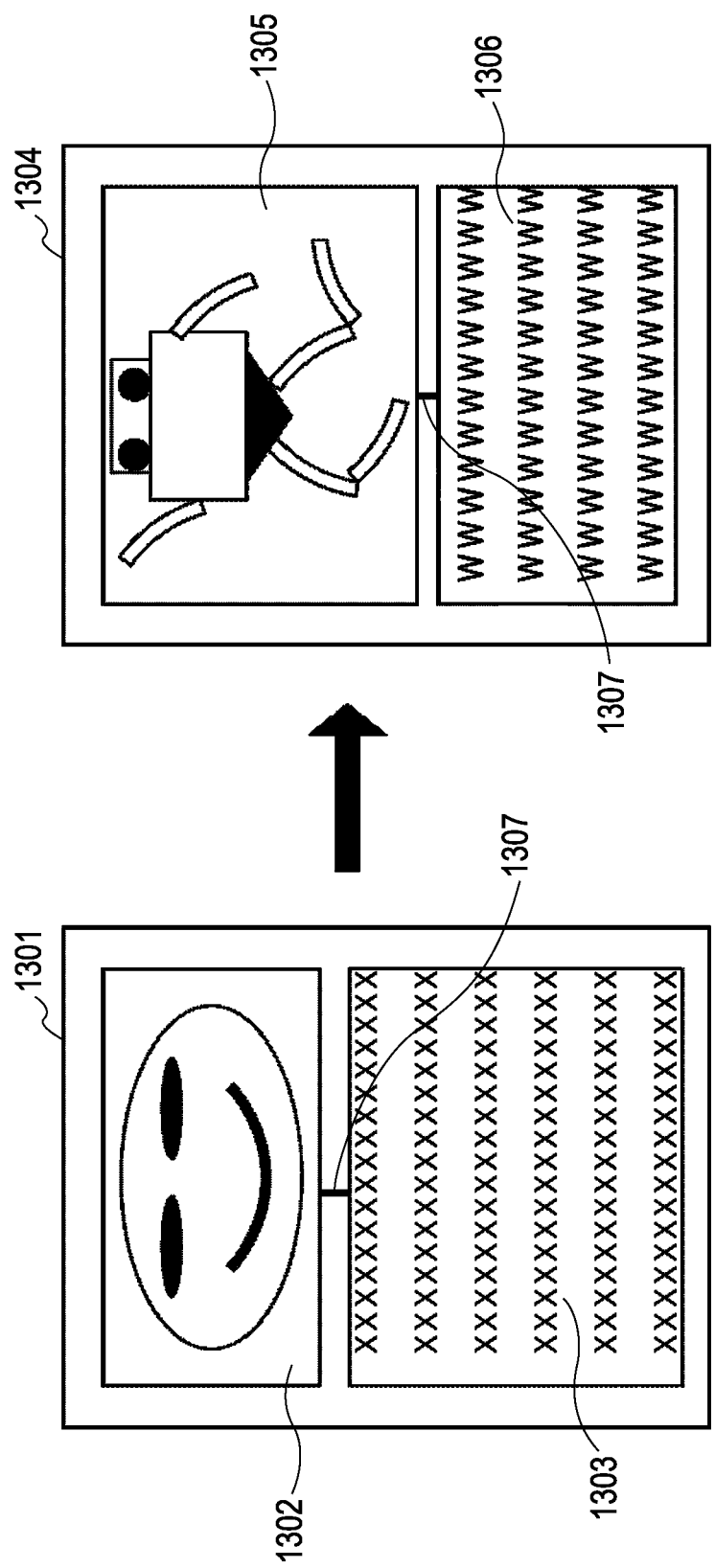
FIG. 12 is a layout example of a sub-template according to the present invention.
Figure 13:
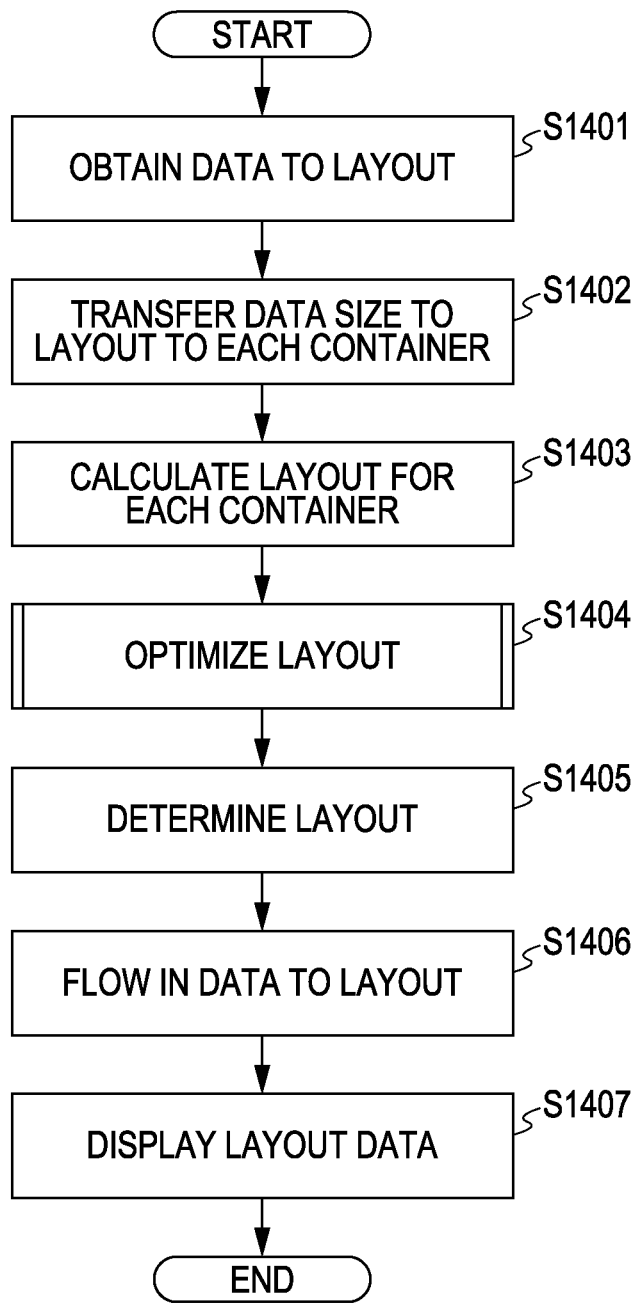
FIG. 13 is a flowchart describing layout of a sub-template according to the present invention.

An overview and layout flow will be described for the above-described sub-template. FIGS. 12 and 13 show a layout example and layout flow, respectively, of a sub-template. The sub-template has an arbitrary number of image containers and text containers disposed therein, and can set which content data (which item) of the record is to be allocated to the container.

The sub-template is useful in the case of using a large number of the same layout in one document. The container disposed in the sub-template is similar to the above-mentioned image container and text container, and a link can also be set between each container. Accordingly, with the data to be laid out, the layout size can be optimally changed. FIG. 12 shows a layout example of a sub-template 1301, 1304. Reference numerals 1302 and 1305 denote image containers, 1303 and 1306 denote text containers, and 1307 denotes a link. The content size of image and text differ, whereby optimal layouts for each as to different records are calculated and show a state of a changed layout.

The layout processing with the sub-template will be described with reference to FIG. 13. The flow of the layout processing in the sub-template is as shown in FIG. 13.

The layout editing application obtains a record for layout from the database (S1401), and obtains the size of the content data to be inserted in each container within the sub-template (S1402). Specifically, a user interface which is one of the modules making up the layout editing application 121 as described above performs associating processing with the database. Consequently, the layout editing application 121 is enabled to reference the content data of the database, and the size and so forth can be obtained by understanding the data in that event. Note that the steps S1401 and S1402 may be performed simultaneously.

The processing in S1402 is enabled to obtain the size of the content data by the layout editing application 121 analyzing the data information obtained in S1401. Note that the size of the obtained content data is to be held in the memory unit 136.

The layout editing application 121 performs layout calculations for each container based on the data size obtained in S1402 (S1403), and optimizes the template layout (S1404). The method for optimizing is executed using a processing in FIG. 7A as described above.

The layout editing application 121 determines the layout of the template optimized in S1404 (S1405), inserts the content data into each container (S1406), and displays this (S1407). Note that the layout determined in S1405 is temporarily held in a memory unit. Also, if the display in S1407 is to be performed together when the document is completed, step S1407 is unnecessary. Also, the size of the sub-template is changed based on the size of the content data.

Conditional Expressions

Sub-Template Conditional Expression

The sub-template conditional expression can selectively allocate multiple types of sub-templates as to one flow area. The content data included in the record extracted by the conditional expression (extracting condition) is inserted in the container within the sub-template set in the flow area.

Figure 14:
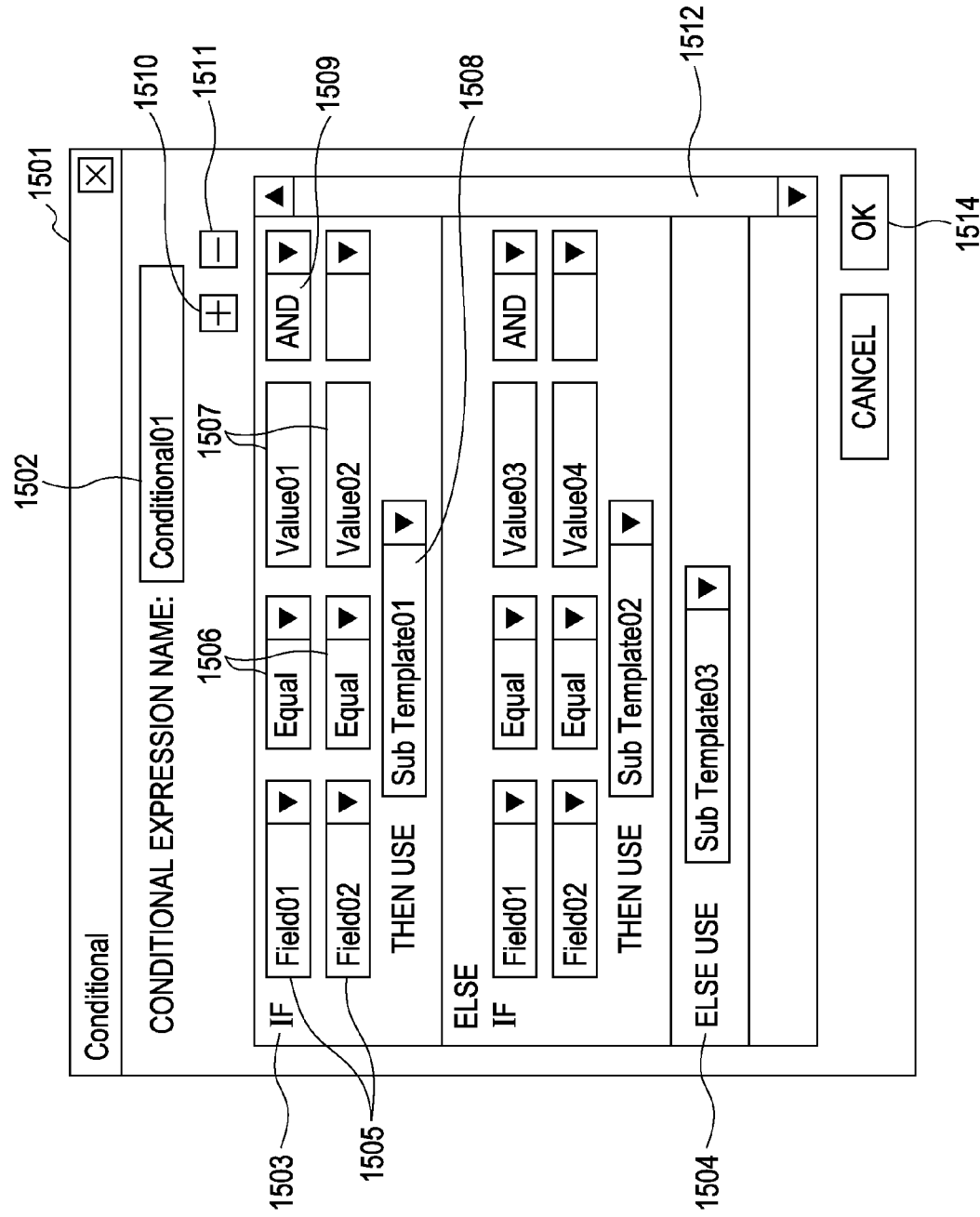
FIG. 14 is an example of a conditional expression setting user interface according to the present invention.

Also the conditional expression includes identifying information of the sub-template applied when complying with conditions. FIG. 14 shows an example of a user interface 1501 setting conditional expressions, and a record complying with the conditional expression set in the flow area is inserted in the container of the sub-template associated with the conditional expression. The sub-template wherein the content data of the record is inserted is disposed on the flow area.

The input region has at least a text box 1502 to add a name to the conditional expression, and a pair of an IF statement 1503 and ELSE statement 1504 which are elements to configure the most basic condition determinations. The input region of the IF statement has a list box 1505 to perform field selection to be subject to condition determination, and a list box 1506 which sets a logical expression for determination. Further, the input region has a text box 1507 to input the values used for determination and a THEN_USE processing statement 1508 to determine the sub-template used when the condition determination is positive. Further, the input region has an ELSE_USE processing statement 1504 to determine the sub-template for inserting the record when the condition determination result is negative. "EQUAL", "NOT_EQUAL" and so forth are prepared in the determination logical expression 1506. The other logical expressions have "LESS_THAN", "LARGER_THAN", "START_WITH", "END_WITH", and so forth.

Further, in order to set a complicated conditional expression, an AND/OR connect statement combo box 1509 is included in order to set a compound condition in the IF statement. By selecting a compound condition of AND or OR with the combo box, a one row of a condition row is added into the IF statement. Only when the multiple conditions are positive in the case of AND, and when one of the conditions are positive in the case of OR, the IF statement is determined to be true. Also, an ELSE_IF statement adding button 1510 is included in order to set a further complicated conditional branching. Upon the button 1510 being pressed, a new ELSE_IF statement is additionally inserted between the above-mentioned IF statement and ELSE statement. The content and operation of the ELSE_IF statement is the same as the content in the IF statement. Processing is performed in the sequence of determining an ELSE_IF statement one level below when the IF statement is negative, an ELSE_IF statement one more level below when the determination is negative, and this is continued to finally determine the ELSE statement. 1511 denotes a delete button to delete the selected ELSE_IF statement. In the case of many ELSE_IF statements, a scroll bar 1512 can be used to display a list of conditions. In the case determination is made that one of the IF statements or ELSE_IF statements is true, the USE processing statement thereof is executed. The name of the sub-template is input (selected) in the USE processing statement. Thus, a sub-template satisfying condition can be automatically selected for each of the records taking various values through a conditional expression, and various layouts can be realized with one conditional expression. By associating the conditional expression to the flow area, a sub-template with multiple types of sub-templates having various layouts can be disposed within a single flow area.

Upon inputting the conditions, the user finally presses the OK button 1514. With the pressing of the OK button 1514, information showing sub-template conditions set with the user interface is saved in the memory used 136 as a portion of sub-template information 2403. The sub-template condition expression may be any information such as a text file having saved the text written (selected) in the user interface in FIG. 14, as long as the information can specify the conditions and the sub-template in the case that conditions are satisfied. In the example in FIG. 14, "IF field01 EQUAL value01 AND field02 EQUAL value02 THEN USE subtemplate01 ELSE IF field01 EQUAL value03 AND field02 EQUAL value04 THEN USE subtemplate02 ELSE USE subtemplate03" is saved as information shown with a sub-template conditional expression. Even if this is saved as is, the information is written in simple grammar, and is input from a user interface such as shown in FIG. 14 whereby grammatical errors and so forth are unlikely to occur. Therefore, a sub-template can be determined by parsing a description of the conditionals with a simple program.

Thus the conditional expression has the conditions to extract the content data for layout from the database and the sub-template used in the case of satisfying the conditions associated and held therein. Accordingly, which sub-template to dispose the extracted content data in is held in the memory unit 136 as associated information. Also, as described above, multiple conditional expressions can be set. Therefore, multiple types of sub-templates can be disposed in the flow area.

Sub-Template Flow

Figure 15:
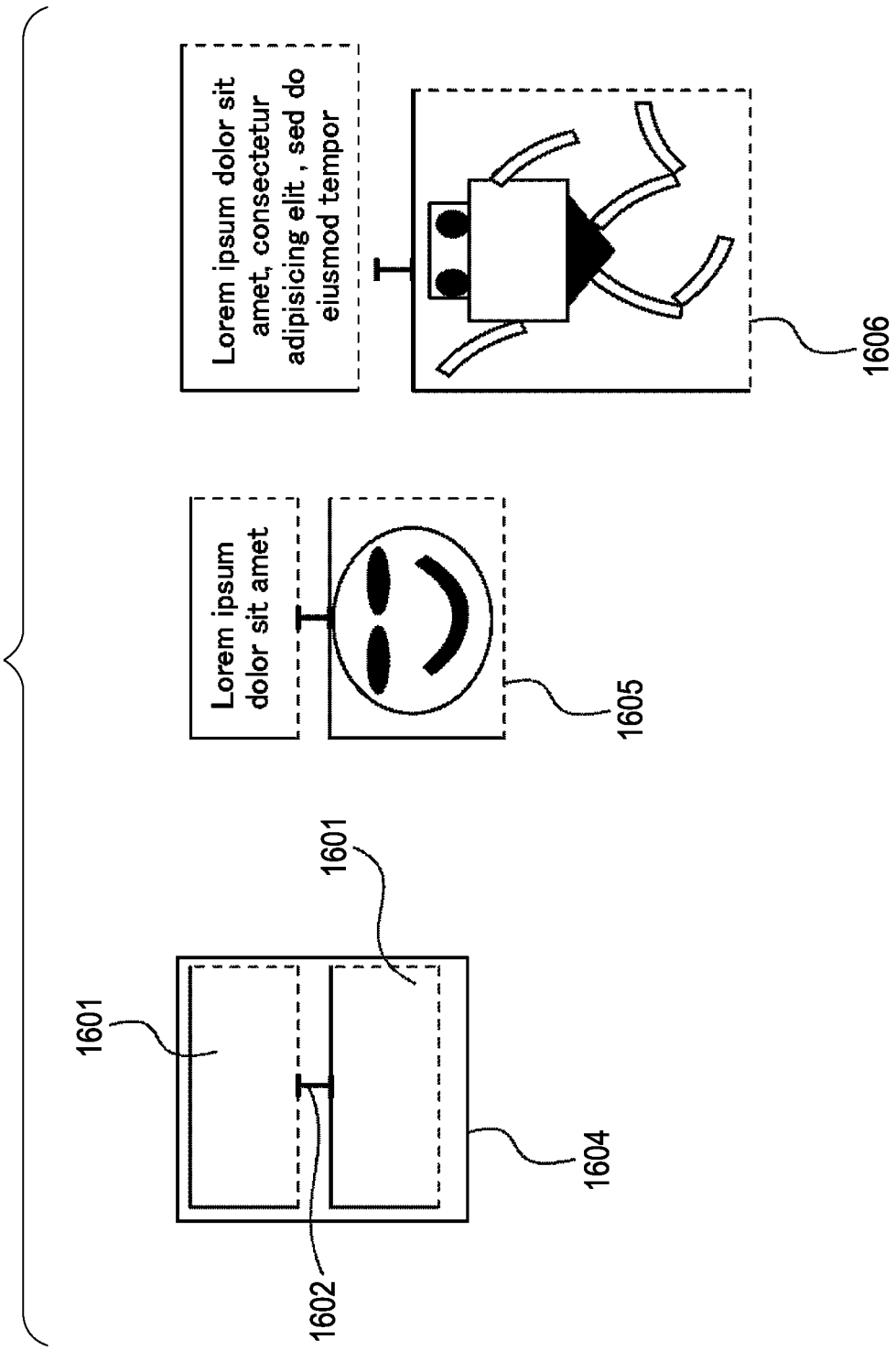
FIG. 15 is a layout example of a sub-template according to the present invention.

The state of the sub-template disposed in the flow area will be described. A state of disposing the sub-template 1604 wherein multiple containers 1601 have been associated with the link 1602 on the flow area will be described with reference to FIG. 15.

Two records are extracted with the extracting conditions of the flow area where the sub-template is set, and both are allocated to the sub-template 1604.

Consequently, since the size of content data included in the extracted record differs, a sub-template with records allocated which include small-size content data becomes 1605 as a result of executing the layout processing in FIG. 13. On the other hand, a sub-template with records allocated which include large-size content data becomes 1606.

Now, a database is prepared wherein records including small-size content data and records including large-size content data are alternately saved, and a sub-template is disposed in the flow area according to the flow direction of the flow area set in FIG. 11. Consequently, a layout result such as shown in FIG. 16 is output.

Figure 16:
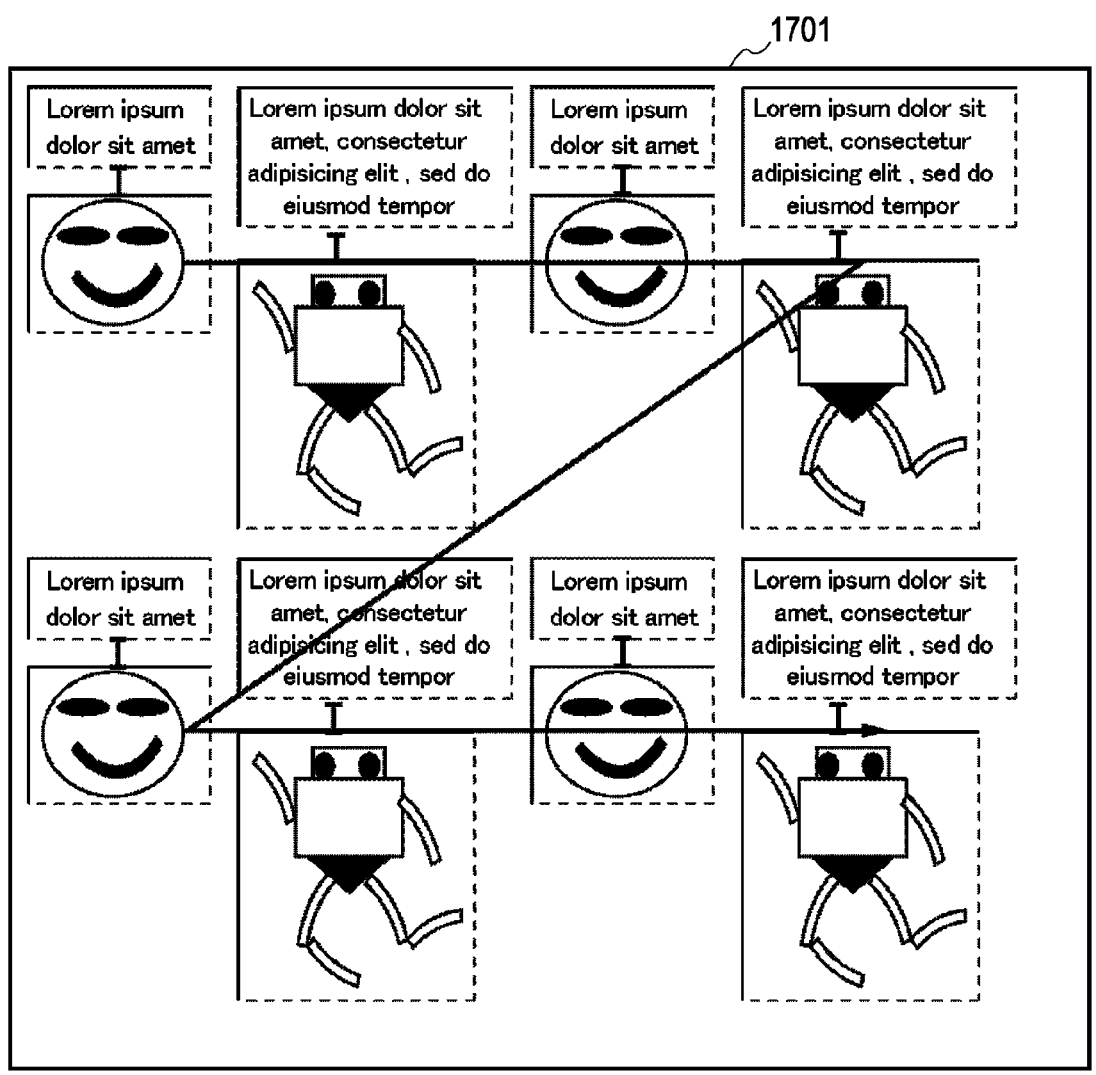
FIG. 16 is a diagram showing an example of layout results according to the present invention.
Figure 17:
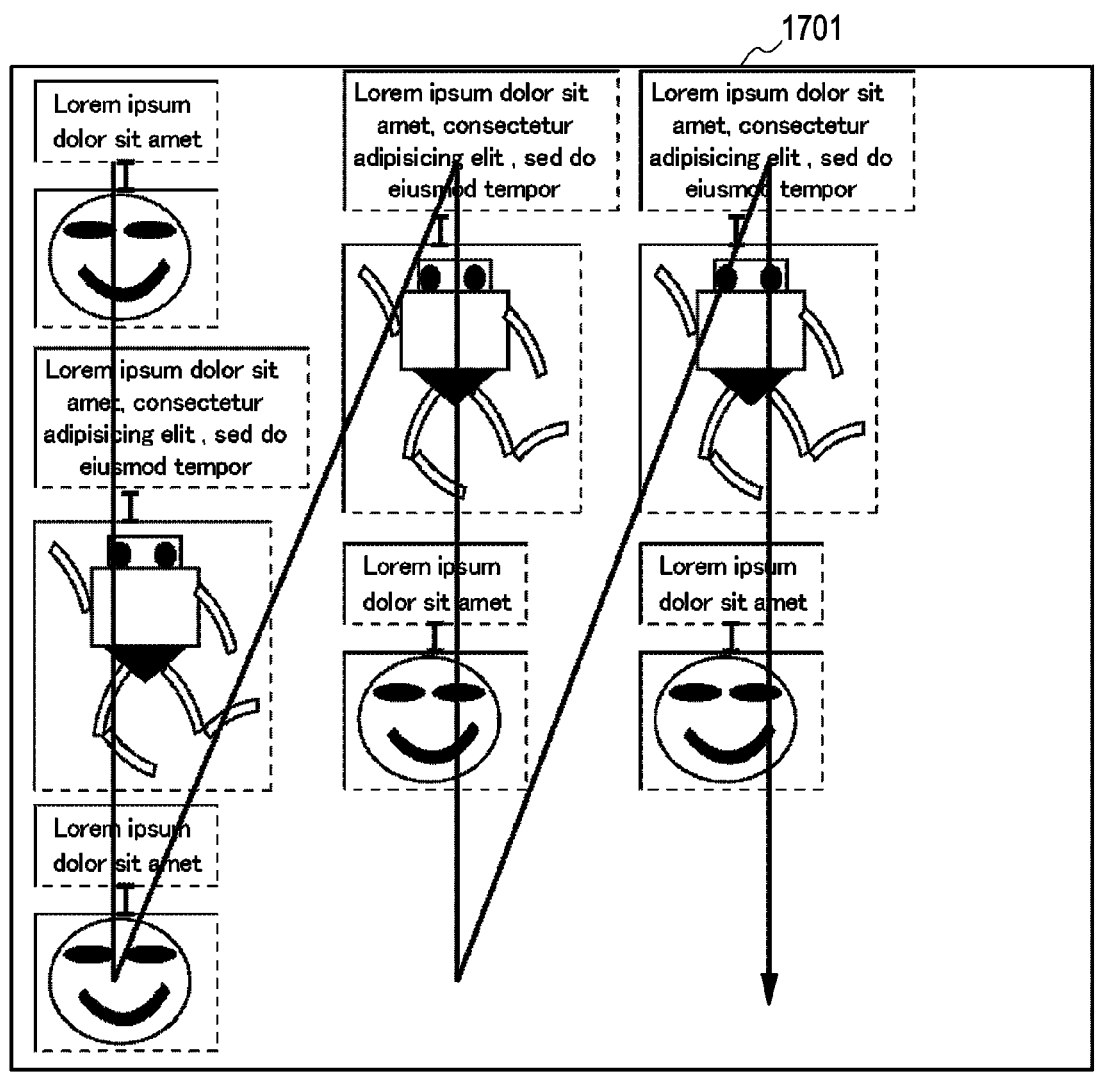
FIG. 17 is a diagram showing an example of layout results according to the present invention.

In FIG. 16, the "from upper left towards the right" flow direction in FIG. 11 is applied to the flow area 1701. In FIG. 17, the "from upper left towards the bottom" flow direction in FIG. 11 is applied. The arrows within each diagram are added to aid in understanding the disposal direction of the sub-template, and such arrows are not displayed on an actual layout.

Figure 18:
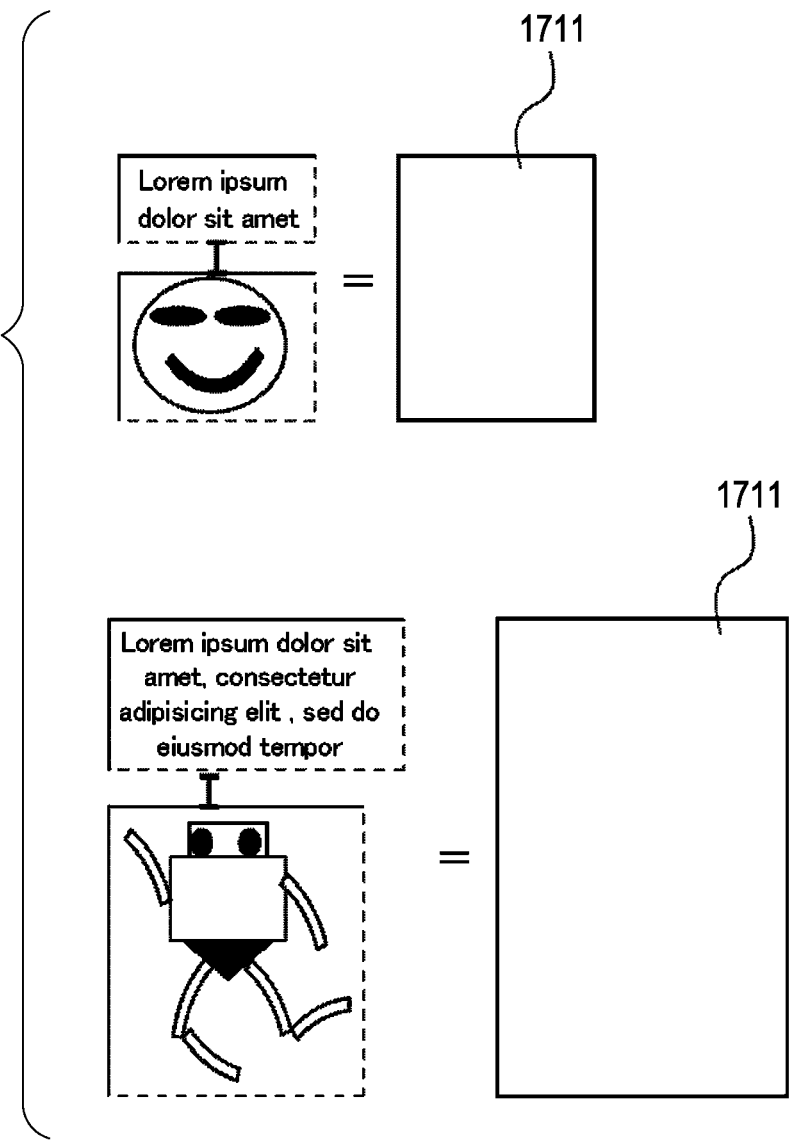
FIG. 18 is a simplified diagram of a sub-template according to the present invention.

For the purpose of simplification, FIG. 18 shows the sub-templates with content data laid out in each container by using a simple rectangle 1711 instead. In other words, the rectangle 1711 shows the size of the sub-template.

Figure 19:
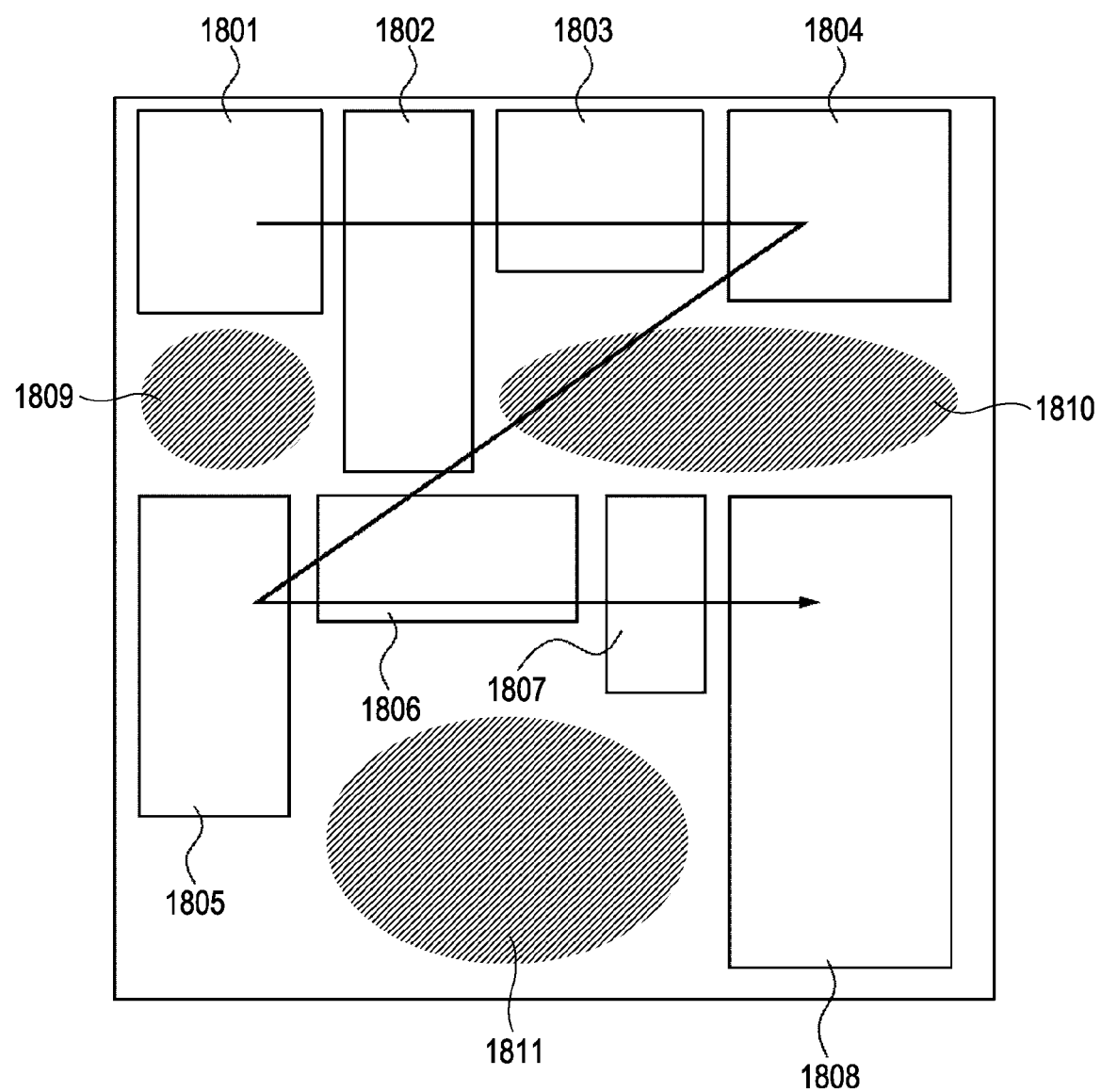

FIG. 19 shows the result of disposing multiple sub-templates in the flow area. The eight rectangles 1801 through 1808 are the same as the rectangles 1711 shown in FIG. 18, and are sub-templates subjected to layout which are shown in a simplified manner. The oval-shaped shaded regions 1809 through 1811 in FIG. 18 show that a sub-template is not disposed in such region and that the region is blank. An arrow is added here in order to show a model of the flow direction of sub-templates.

As shown in FIG. 19, the sub-templates are output in various sizes according to the content data of the allocated records, whereby blank areas can occur in the layout of the flow area. Also, using the conditional expression shown in FIG. 14, in the case of disposing multiple types of sub-templates within a flow area, blank areas occurring in the flow area as in FIG. 19 can be readily estimated.

Figure 20:
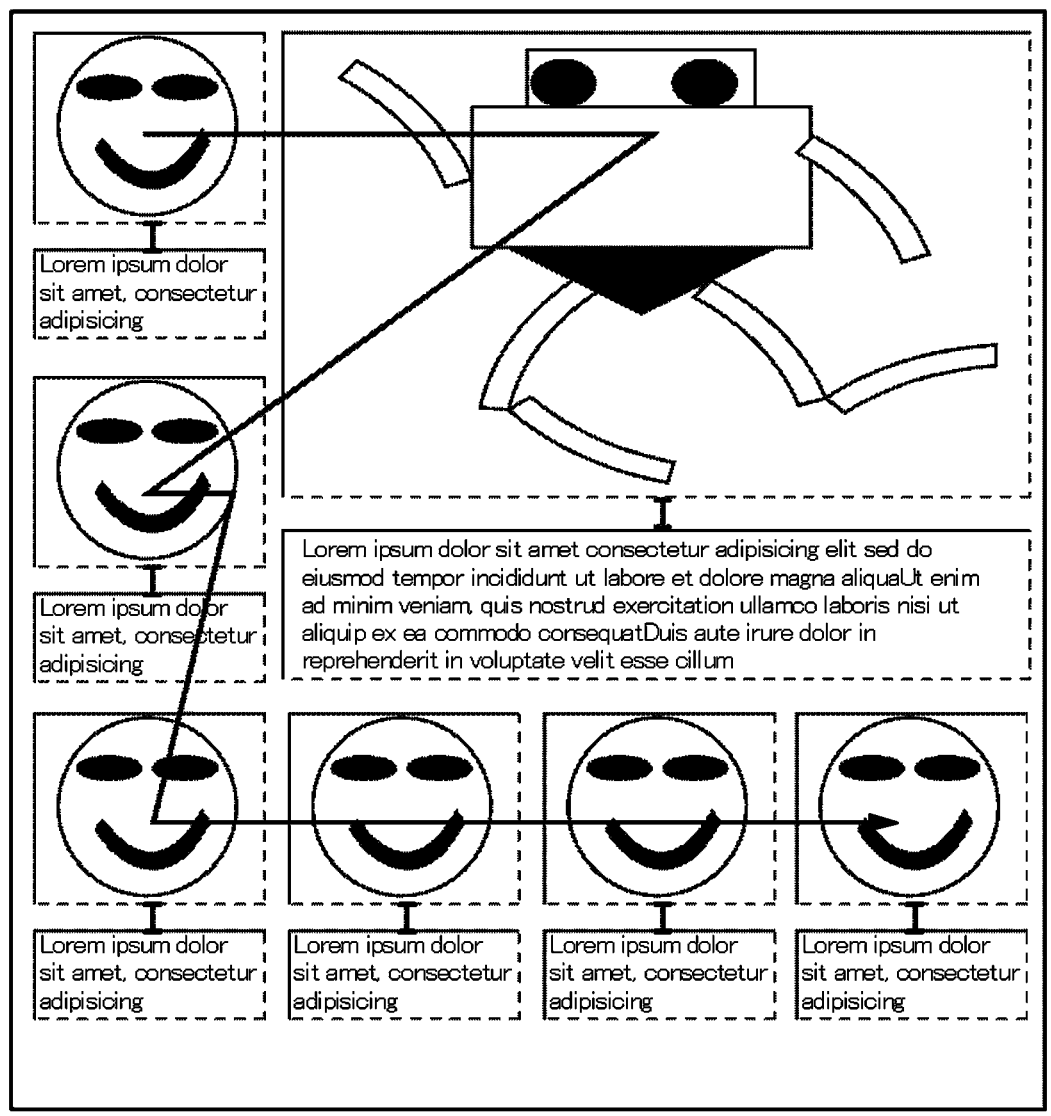
FIG. 20 is a diagram illustrating an example of execution results according to the present invention.
Figure 21:
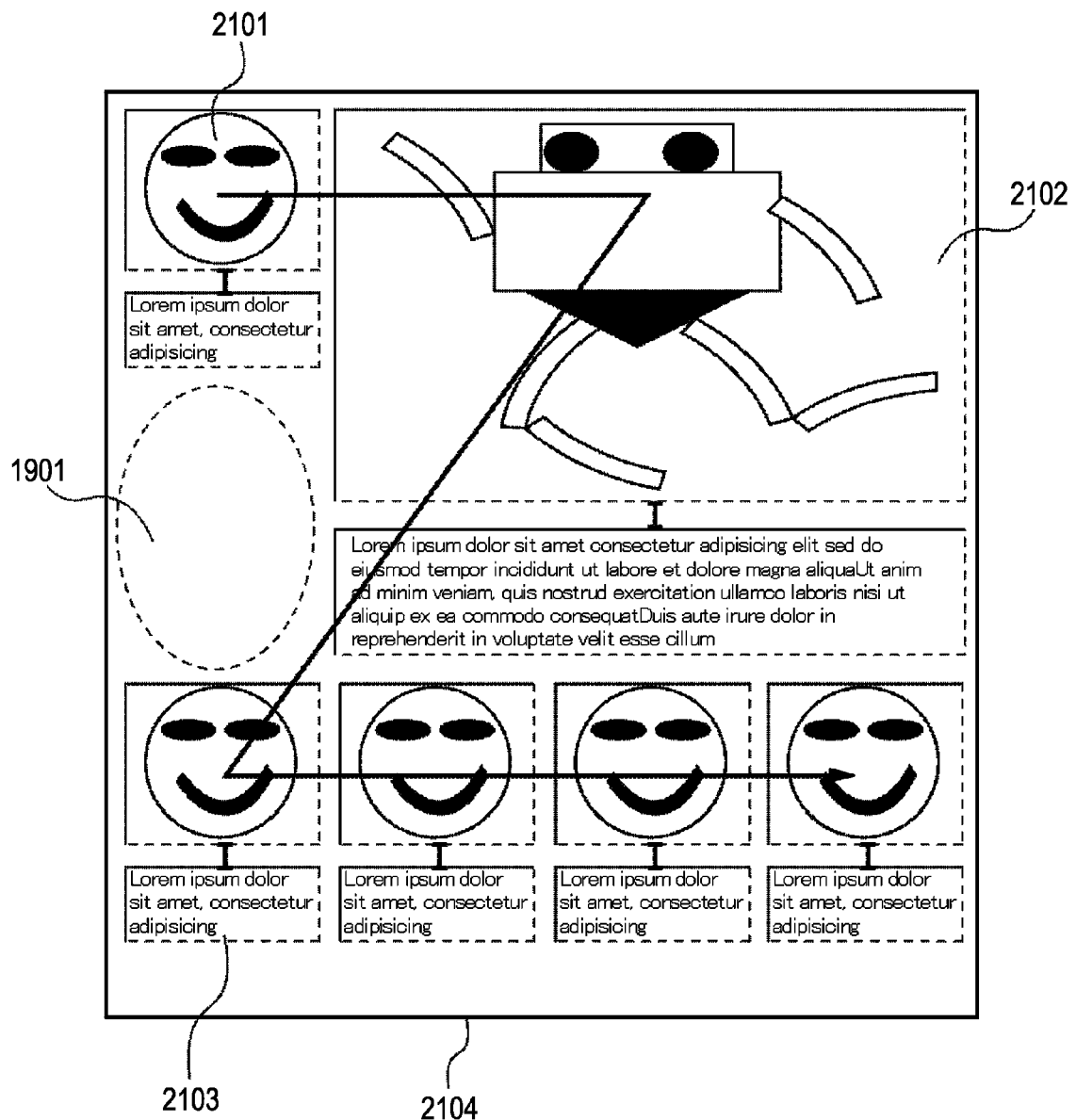

The present invention enables outputting a layout result with as few spaces as possible as shown in FIG. 20. FIG. 21 is a diagram to describe problems occurring with related art, and as a result of disposing the sub-templates 2101 and 2102 as the first row in the flow area, the first sub-template 2103 on the second row is disposed below the sub-template 2102. Therefore a blank area such as 1901 occurs in the flow area 2104.

Figures 22, 22A:
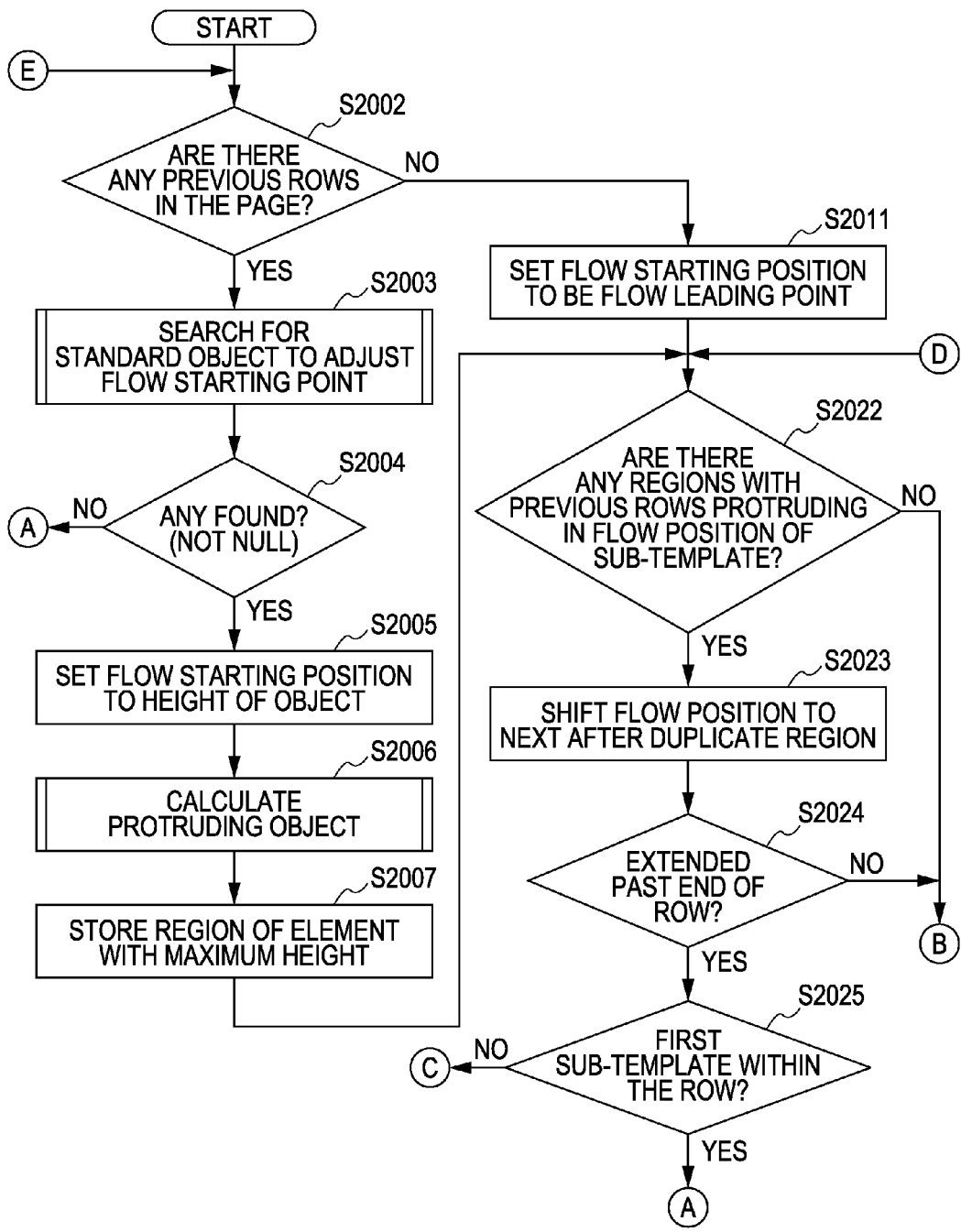
FIG. 22 is a flowchart according to the present invention.
Figure 22B:
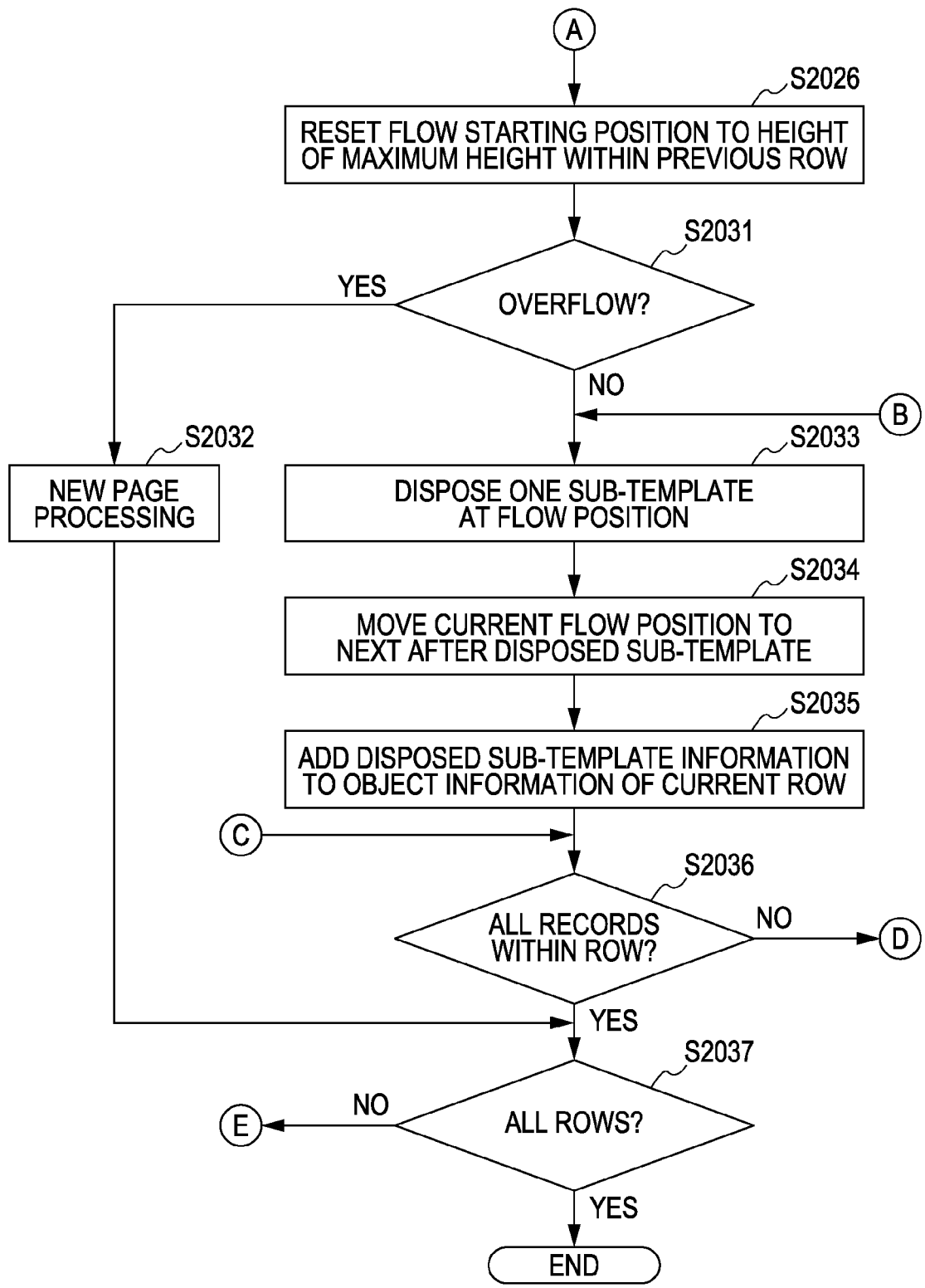
Figure 23:
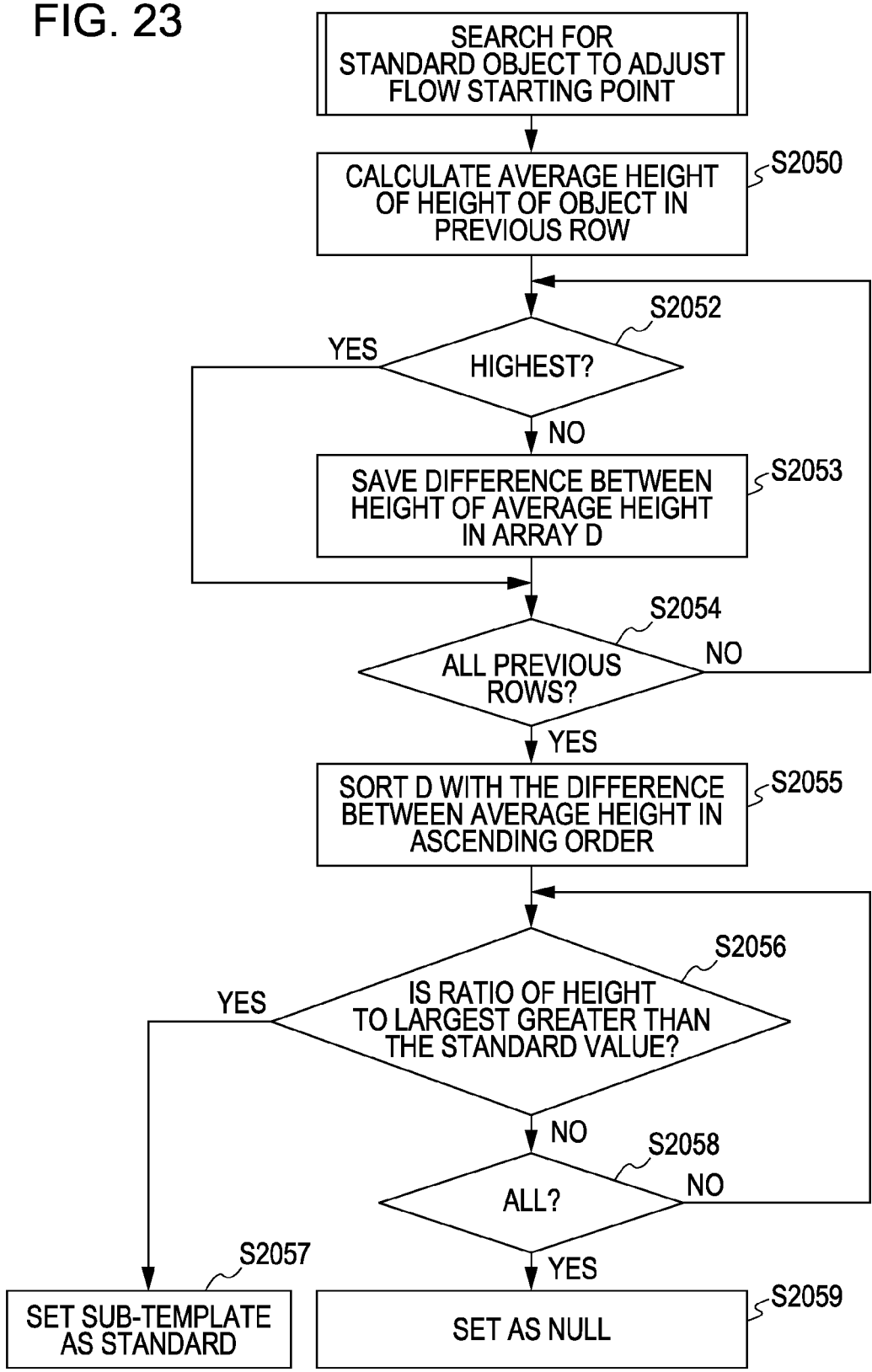
FIG. 23 is a flowchart according to the present invention.
Figure 24:
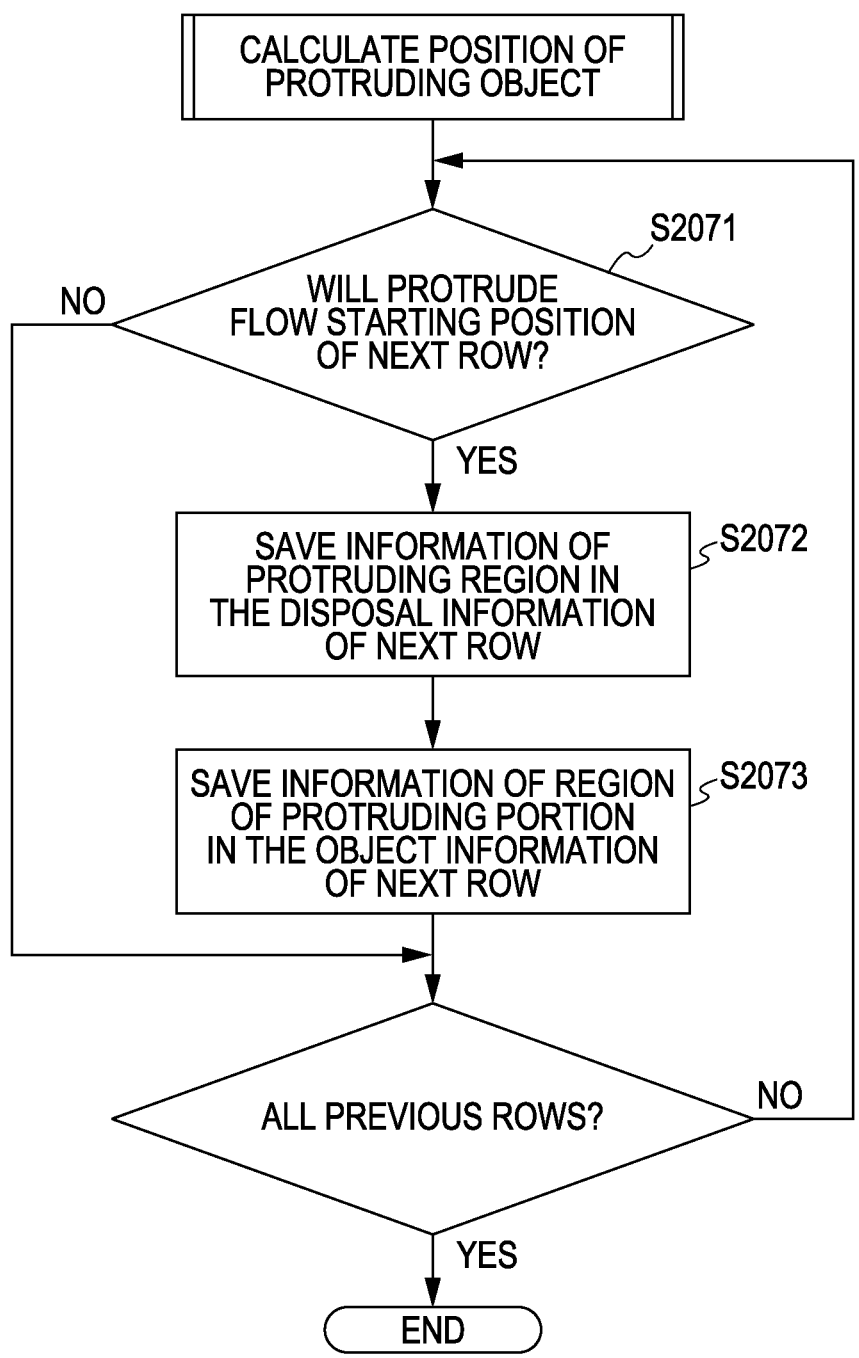
FIG. 24 is a flowchart according to the present invention.

FIG. 22 shows an overall flow of the present invention. FIG. 22 shows a main flow and FIGS. 23 and 24 show subflows. In FIG. 22, a premise is that sub-templates are disposed within the flow area in increments of rows (in increments in the horizontal direction), but depending on the set flow direction, the processing of the present flowchart can be replaced to be in increments of columns (in increments in the vertical direction).

Also, with the present invention there may be cases wherein the row or column to determine the flow starting position is described as the second row or second column. On the other hand, there may be cases wherein the previous row or previous column of the row or column to determine the flow starting position is described as the first row or first column.

First, the layout editing application 121 confirms whether or not there is a previous row (first row) disposed already within the flow area (S2002). In the case that determination is made in S2002 that there is a disposed previous row (first row), the layout editing application 121 searches for a standard sub-template to determine the starting point of a new row (second row) (S2003). On the other hand, if there are no rows already disposed, the layout editing application 121 sets the flow starting position to a lead point of the flow area (S2011).

In the case that a sub-template to serve as a standard is found as a result of the processing in S2003 (S2004), the layout editing application 121 determines the flow starting position of the new row (second row) which is the current target, based on the sub-template to serve as a standard that is searched in S2003. Note that in the case that row spacing (can be set with 1207 in FIG. 12) of the flow area is set, the layout editing application 121 leaves opens the spacing set at this point-in-time and further shifts the flow starting position downward (S2005).

After this, the layout editing application 121 determines whether or not there are any sub-templates that protrude from the previous row already disposed in the downward direction from the starting position, using the determined flow starting position as a standard, and stores the protruded position and size (S2006). Also, the layout editing application 121 stores the region of the sub-template having the maximum height in the previous row already disposed (S2007).

The layout editing application 121 checks whether or not the sub-template disposed in a new row and the sub-template protruding into a new row from the already disposed row are overlapping (S2022). The processing in S2022 uses protruding region information which is computed with the processing in FIG. 24 to be described later, whereby the layout editing application 121 can realize the determining processing in S2022.

In the case an overlap determination is made in S2022, the layout editing application 121 moves the sub-template which is the target in S2022 to a region that does not overlap (S2023). That is to say, the layout editing application 121 uses the protruding region information computed with the processing in FIG. 24 to be described later, whereby the target sub-template can be moved to a position at which it can be disposed to exceed the protruding region. On the other hand, in the case of determining No in S2022, the flow is transitioned to the later-described S2033.

In the case that a sub-template is disposed in the position moved in S2033, the layout editing application 121 determines whether or not the sub-template extends past the end of the row (S2024). In the case determination is made in S2024 that the sub-template extends past the end of the row, the layout editing application 121 determines whether or not the target sub-template is the sub-template at the beginning of the row (S2025). On the other hand, in the case No is determined in S2024, the flow is transferred to the processing in S2033 to be described later.

In the case determination is made in S2025 that the sub-template is at the beginning of the row, the layout editing application 121 sets the flow starting position of the sub-template in the new row below the sub-template having the maximum height of the row already disposed (S2026). In this case, the values stored in S2007 are used.

Subsequently, in the case that the sub-template is disposed from the flow starting position set in S2026, the layout editing application 121 determines whether or not the sub-template overflows the flow area (S2031). In the case determination is made that the sub-template overflows, the layout editing application 121 executes new page processing and generates a page including a new flow area (S2032).

In the case determination is made in S2031 that the sub-template does not overflow, another sub-template to be disposed in the same row is disposed in the flow area, using the starting position set in S2026.

Subsequently, the layout editing application 121 moves the disposal location of the next sub-template to the next position of the sub-template that has been disposed, according to the flow direction setting (S2034). Specifically, in this case the disposal is executed within the row from the upper left towards the right this time, whereby the layout editing application 121 determines the disposal location so that the next sub-template is disposed to the right adjacent to the sub-template that has been disposed.

The layout editing application 121 adds and stores the position and size information of a disposed sub-template to the sub-template information of the new row (S2035). The information stored here is used in the flowcharts in FIGS. 23 and 24.

In the case a No determination is made in S2025, determination is made as to whether or not the processing from S2022 through S2035 has been executed for all of the records to be disposed within the same row (S2036).

In the case that the processing in S2032 is performed, or in the case that the processing from S2022 through S2035 has been executed for all of the records to be disposed within the same row, determination is made as to whether the processing in FIG. 22 is executed for all of the rows in the flow area (S2037).

Next, processing to search for a standard sub-template to adjust the starting point of a flow performed in S2003 in FIG. 22 will be described with reference to FIG. 23.

The layout editing application 121 computes an average value of the height of the sub-template disposed one row before the newly disposed row (S2050).

Next, the layout editing application 121 calculates the height of each sub-template disposed in the previous row, and determines whether or not each is the highest sub-template of the sub-templates disposed in the previous row (S2052).

In the case determination is made in S2052 that a sub-template is not the highest sub-template, the layout editing application 121 calculates the difference between the average value computed in S2050 and the height of the current target sub-template. The layout editing application 121 saves the calculation results in an array D on the memory as values for the sub-template.

After the processing in S2053, the layout editing application 121 determines whether the processing in S2052 and S2053 for all of the sub-templates of the previous row has been executed (S2054).

In S2054, in the case of executing the processing in S2052 and 2053 as to all of the sub-templates of the previous row, the difference value for each sub-template is sorted in ascending order, using the array D of the memory (S2055).

Next, the layout editing application 121 determines whether or not the ratio of the height of the current target sub-template and the height of the highest sub-template in the previous row is at or above a standard value (S2056). That is to say, the layout editing application 121 determines whether or not the difference between the height of the highest sub-template and the sub-template currently to be determined is at or above a predetermined value.

In the case that the ratio of the height of the sub-template and the height of the highest sub-template in the previous row is at or above a standard value, the layout editing application 121 stores the height of the sub-template currently to be determined and specifies this as a standard sub-template (S2057).

On the other hand, in the case that the ratio of the height of the sub-template and the height of the highest sub-template in the previous row is not at or above a standard value, the layout editing application 121 determines whether the processing in S2056 has been executed for all of the sub-templates of the previous row (S2058).

In the case determination processing is executed for all sub-templates, the layout editing application 121 stores information to the effect that a standard sub-template to adjust the flow starting point has not been found (S2059). Thus, the sub-template used to determine the starting position of the row from which processing is to be started can be specified from the present processing.

Also, with the present application, the processing in FIG. 23 is executed using an average value, but this should not be limited to an average value. For example, the processing in FIG. 23 may be executed with a mid-point of the sub-template having a maximum height in the previous row serving as an average value in FIG. 23.

Next, the processing to calculate the position of sub-template protruding from the starting position of a new row which is a current target will be described with reference to FIG. 24.

The layout editing application 121 determines whether or not one sub-template disposed on the previous row exceeds (overlaps) the flow starting position determined in S2005 in FIG. 22 (S2071).

In the case determination is made in S2071 that the sub-template protrudes, the layout editing application 121 saves the protruded region of the protruding sub-template (S2072). That is to say, by executing the processing in S2072, the layout editing application 121 can execute the disposing processing of the sub-template protruded from the previous row as an inhibited region.

Further, the layout editing application 121 registers the region information of the protruding portion as one of the sub-templates (S2073). That is to say, the region information of the protruding portion is handled the same as the sub-template information of the next row, and is used in the flowcharts in FIGS. 22 and 23 as sub-template information in the case of disposing the next row.

Figure 27:
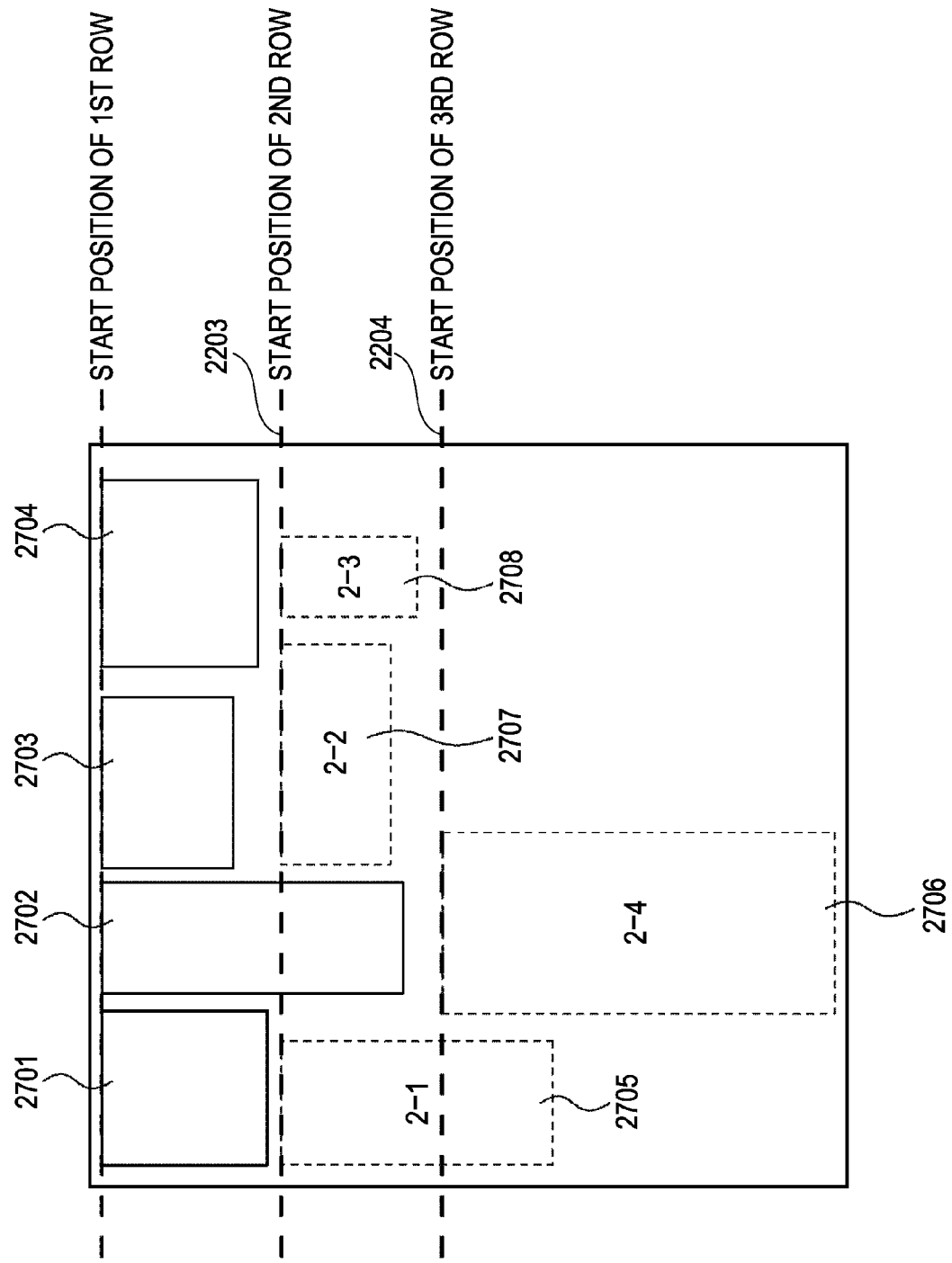
FIG. 27 is a diagram illustrating an example of execution results according to the present invention.

In the case of applying the processing in FIG. 22 above to FIG. 19, the flow starting position of the second row (2705 through 2708) is moved in the upper direction as compared to FIG. 19 as shown with 2203 in FIG. 27. Further, the layout editing application 121 can also dispose the sub-template 2706 in the second row so as to avoid overlapping with the sub-template 2702 which protrudes the flow starting position 2203. On the other hand, the starting position of the third row can also be determined with similar processing. Note that in the case that a sub-template is disposed in the current target row, the processing in FIGS. 22 through 24 is executed for the next row, using the sum of the size of sub-template disposed in the previous row for the next row and the size of the sub-template disposed in the current target row. This will be described in detail with reference to FIG. 27. In order to determine the starting position of the third row, the layout editing application 121 executes processing in FIGS. 22 through 24 using the sum of the sub-templates 2701 and 2705, the size of 2702, the sum of 2703 and 2707, and the sum of 2704 and 2708. The difference between the sum of sub-templates 2701 and 2705 which has the greatest size in the second row and the sub-template 2707 is at or above a predetermined value, whereby as a result of the processing in FIGS. 22 through 24, the starting position of the third row becomes 2204.

Figure 25:
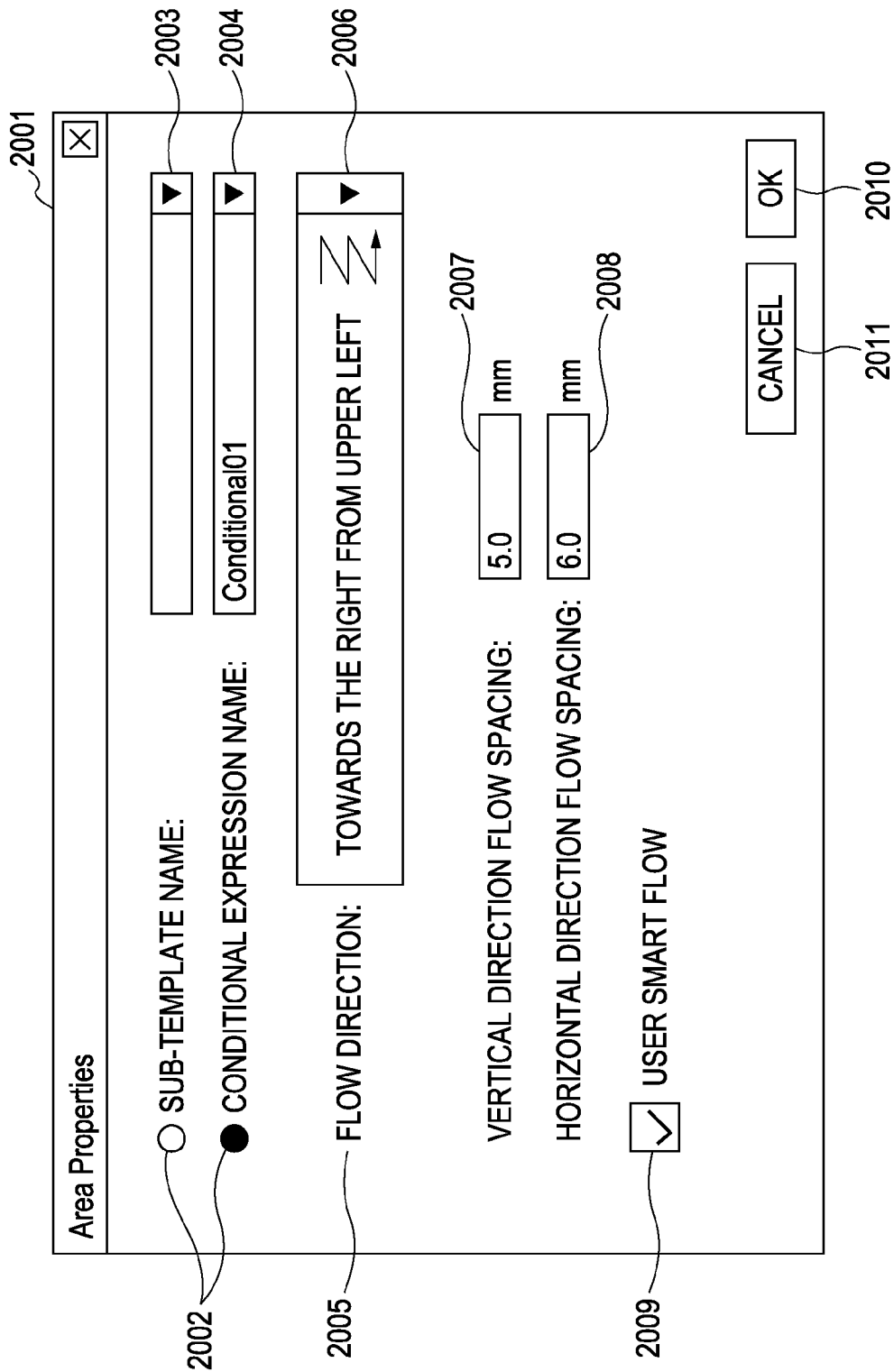
FIG. 25 is an example of a user interface of a setting dialog of a flow area according to the present invention.
Figure 26:
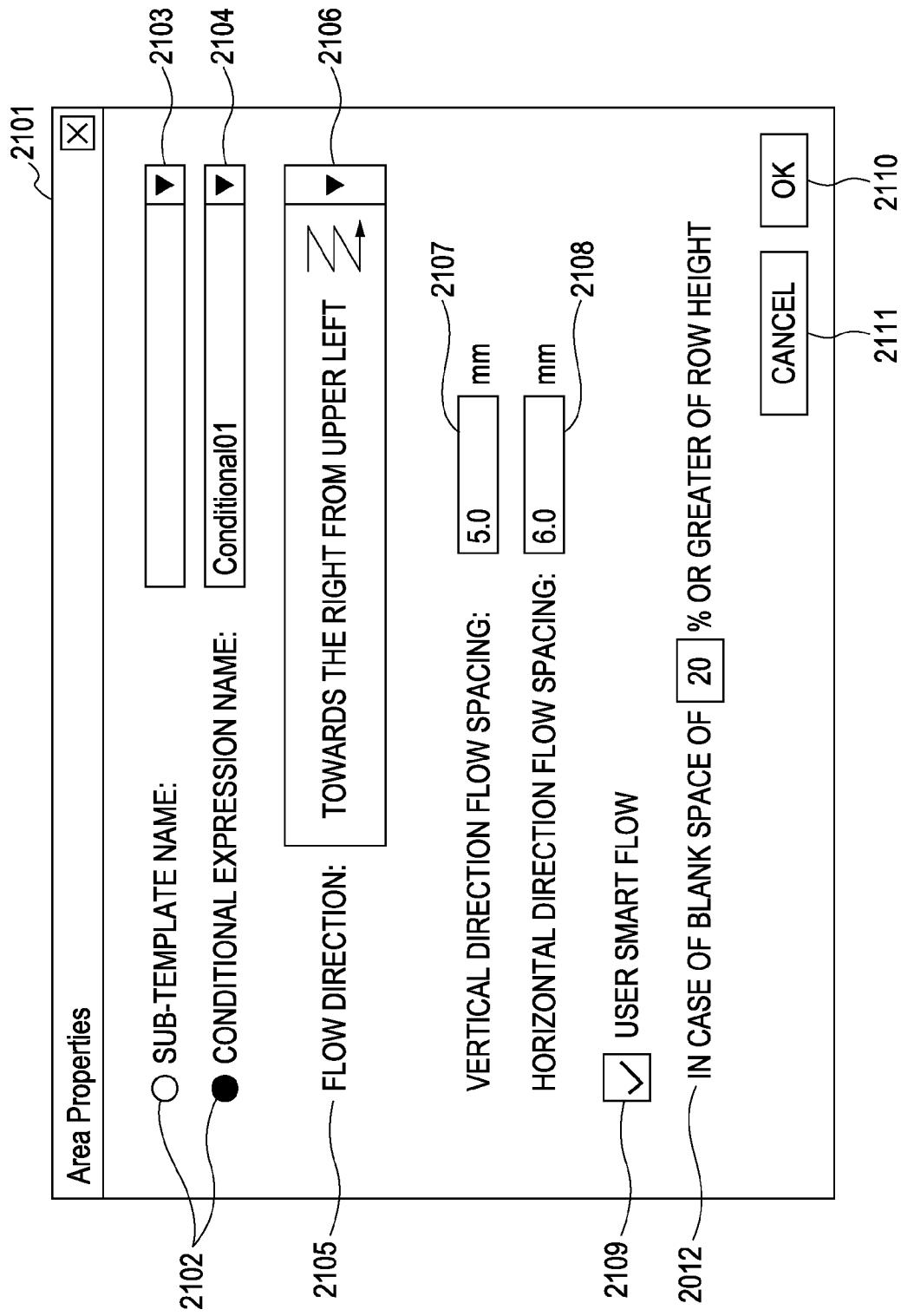
FIG. 26 is an example of a user interface of a setting dialog of a flow area according to the present invention.

In order to validate/invalidate such a flow method, a setting input region (2001-2011, 2101-2012) such as shown in FIGS. 25 and 26 may be used. FIG. 25 calls the present flow method "smart flow", and in the case the check box for this is checked, the layout editing application 121 executes the processing in FIGS. 22 through 24, and on the other hand, if not checked, does not execute the processing in FIGS. 22 through 24. FIG. 26 further shows an arrangement wherein a standard value used in the flowchart in FIG. 23 can be set. By employing the processing in the present embodiment, a layout result with as little as possible blank area can be output.

Note that in FIGS. 22 through 24, processing has been described for determining the starting position of the row, but as described above, the starting position of a column can also be determined with similar processing. In this event, the "height" considered in FIGS. 22 through 24 is replaced with "width". Also, the processing related to the vertical direction is replaced with horizontal processing.

Some embodiments of the present invention relate to processing to correspond to the disposal state of various types of sub-templates.

Figure 28:
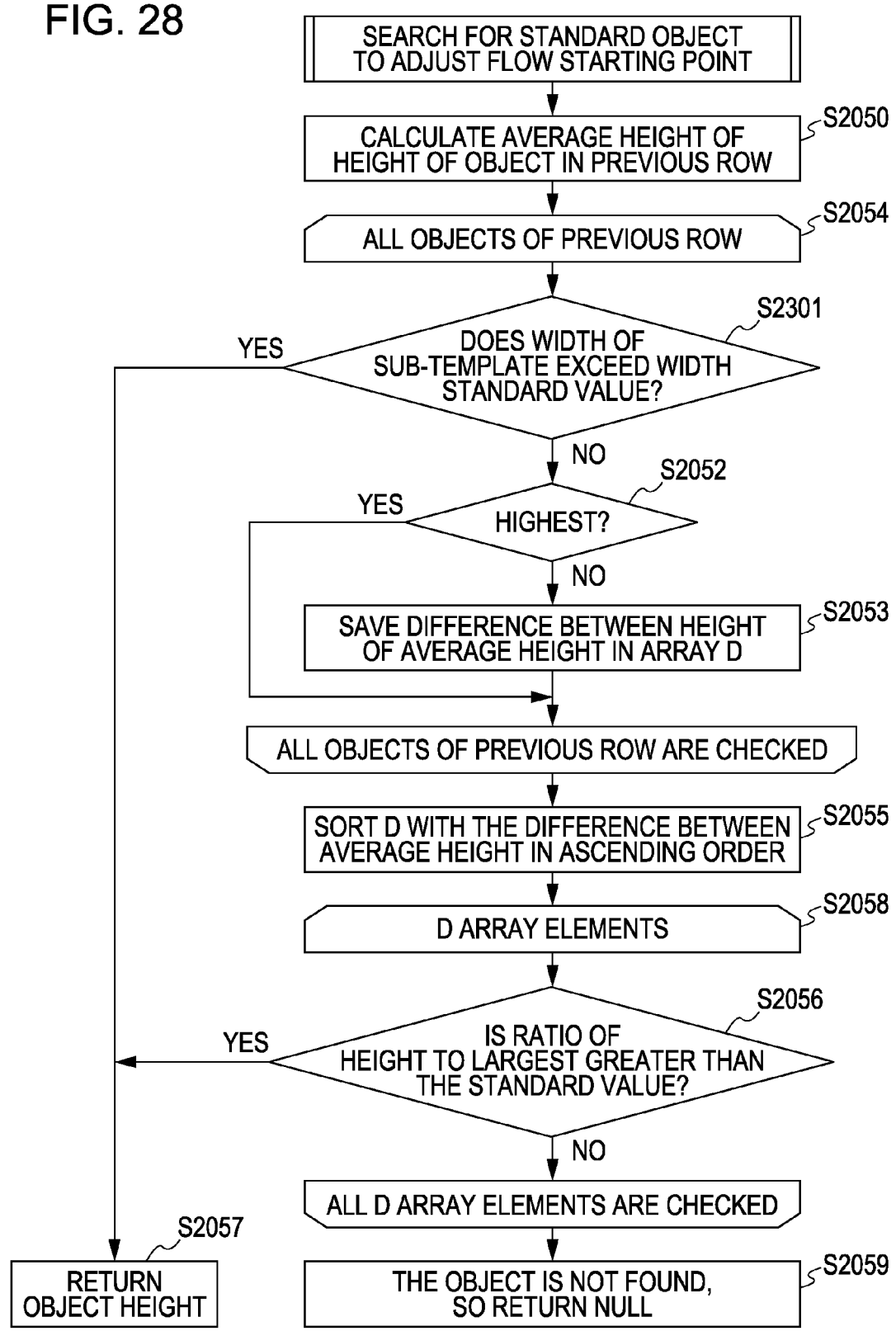
FIG. 28 is a flowchart according to the present invention.

FIG. 28 shows a modification of the flowchart in FIG. 23. The modified point is the determining processing in step S2301. In S2301, the layout editing application 121 determines whether or not the width of the sub-template currently to be determined is exceeding the standard value of the width set by the user. Specifically, the layout editing application 121 executes the determining processing in S2301 by calculating the ratio of the width of the sub-template currently to be determined compared to the width of the flow area for disposing the sub-template.

In the case determination is made in S2031 that the width of the sub-template exceeds the standard value, the layout editing application 121 saves the height of the sub-template as the flow standard position of the next row (S2057). The other processing therein is the same as in FIG. 23, so the description thereof will be omitted.

Figure 29:
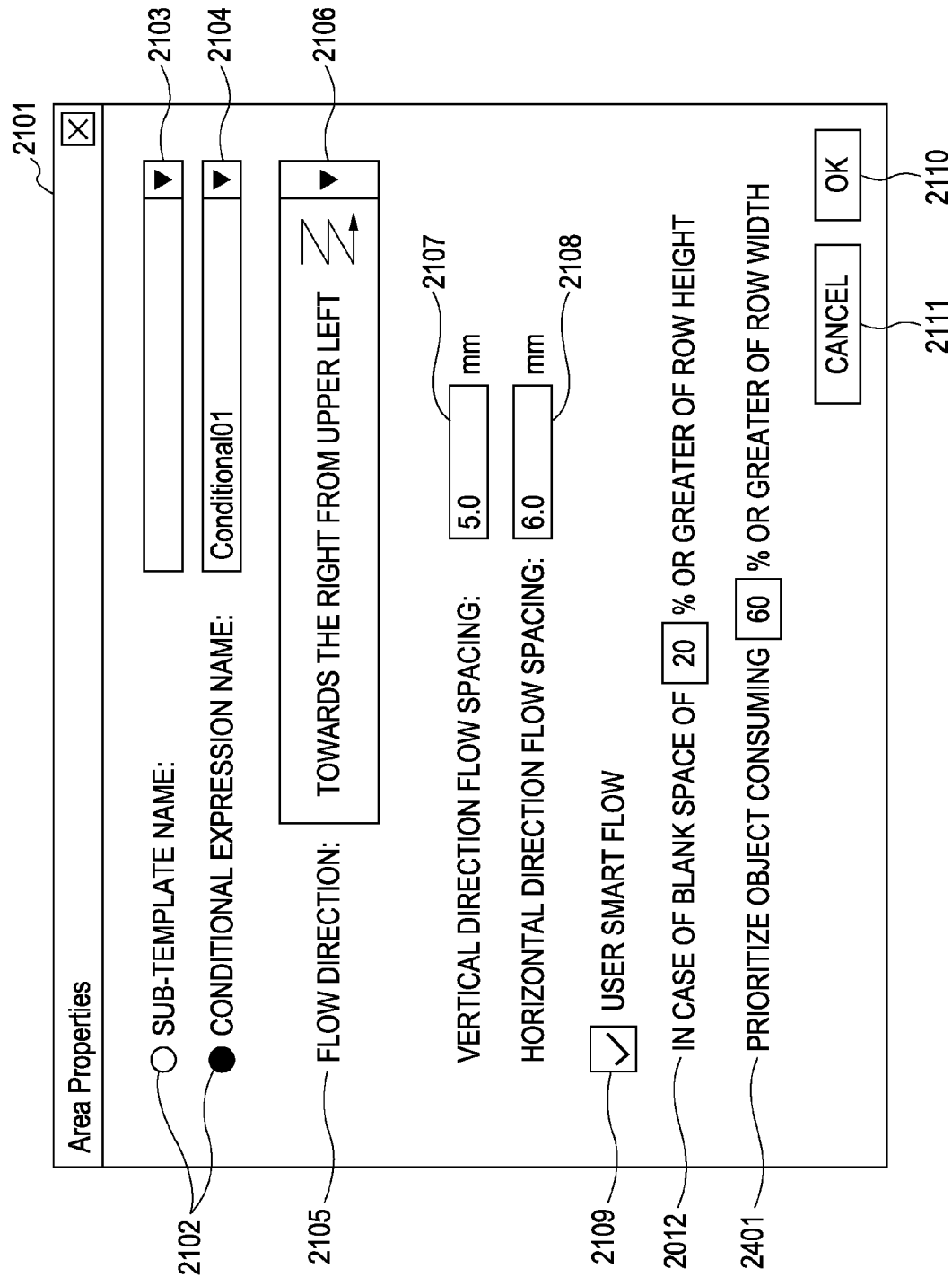
FIG. 29 is an example of a user interface of a setting dialog of a flow area according to the present invention.

The width standard value stipulated by the system may be held in a fixed manner in the system, but an arrangement may be made wherein a value such as the input region 2401 is used and set from the setting input region such as shown in FIG. 29.

Note that the standard value is stipulated here as the ratio between widths of the sub-template and the flow area, but an arrangement may be made wherein the standard value is specified as an absolute value such as millimeters, for example.

In some embodiments, by specifying a sub-template to serve as a standard using the width of the sub-template, a sub-template influencing the flow position of the next row greatly can be specified. As a result, other processing can be omitted and the starting position of the next row can be determined efficiently, and also a more appropriate flow starting position can be determined by considering not only the height but also the width of the sub-template.

Figure 30:
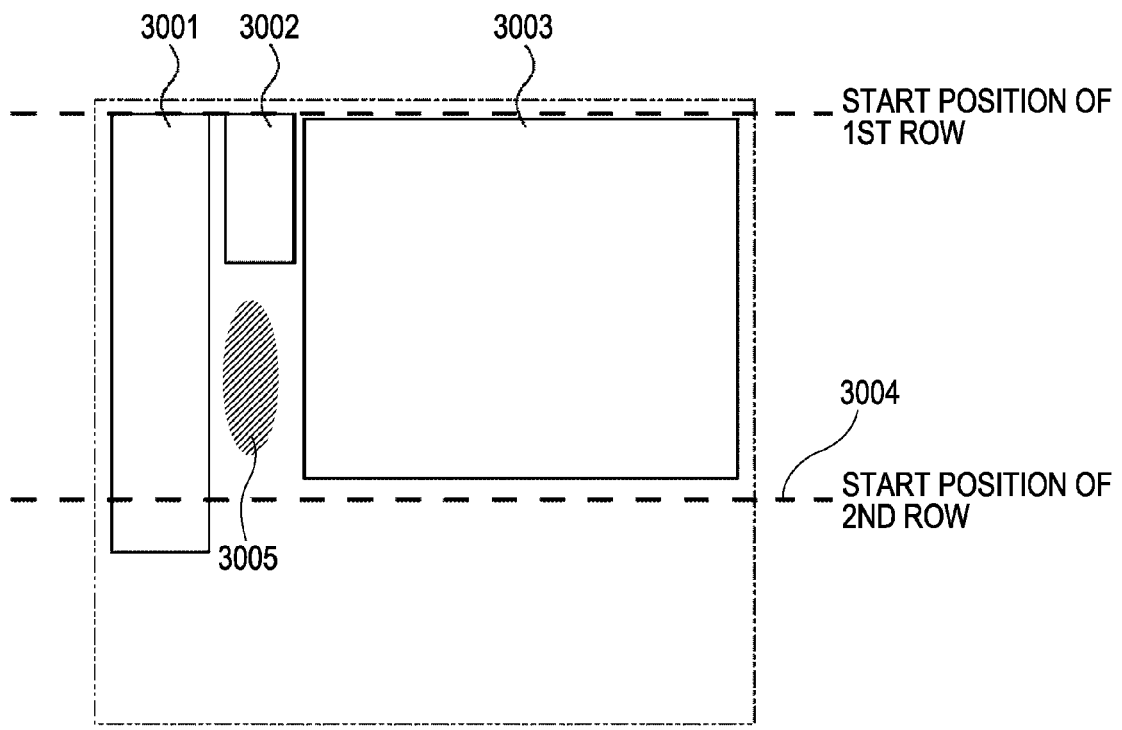
FIG. 30 is a diagram illustrating an example of execution results according to the present invention.

For example, in FIG. 30, the sub-templates 3001 through 3003 are disposed in the flow area. Upon executing the processing in some embodiments, the sub-template on the second row is disposed in a blank area 3005 between the sub-template 3002 and the flow starting position 3004 of the second row. However, in the case that the blank area 3005 is small enough that ignoring this is acceptable, the processing in the present embodiment is used, thereby enabling executing layout processing to be efficient and in a manner that is attractive for a user to view.

Note that the processing according to the present application is executed using sub-templates for FIGS. 22 through 24 and 28, but an arrangement may be made wherein the sub-template may be simply replaced with objects such as shapes, images, and so forth. Thus, with the present invention, a layout result that a user desires and is visually attractive for a user can be output.

Note that the present invention may be applied to a system made up of multiple devices (e.g. host computer, interface device, reader, printer, etc) or may be applied to an apparatus made up of a single device (e.g. photocopier, facsimile device, etc). Also, the present invention supplies a recording medium which records program code to realize the functions of the above-described embodiments to a system or apparatus, and the control program stored in the storage medium is read out and executed by a computer of the system or apparatus. In this case, the program code itself that is read out from the storage medium realizes the functions of the above-described embodiments, and the program code itself and the storage medium having stored the program code makes up the present invention.

Also, the present invention includes cases wherein, based on instructions of the program code, an operating system (OS) running on the computer performs a portion or all of the actual processing, and by such processing the functions of the above-described embodiments are realized. Further, the present invention is also applicable to cases wherein the program code read out from the storage medium is written into a function expansion card inserted in the computer or the memory associated with a function expansion unit connected to the computer. In this case, based on instructions of the written-in program code, the CPU associated with the function expansion card or function expansion unit performs a portion or all of the actual processing, whereby the functions of the above-described embodiments are realized.

Also, embodiments of the present invention have been described regarding an apparatus or method centered on the present invention. Accordingly, description of the embodiments includes additional configuration elements as well as the primary portions of the present invention. That is to say, providing configuration elements for the apparatus or method described in accordance with the embodiments of the present invention gives sufficient conditions to establish the present invention, but these are not indispensable conditions.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-283546 filed Oct. 31, 2007, which is hereby incorporated by reference herein in its entirety.

What is claimed is:

1. An information processing apparatus comprising:
a receiving unit configured to receive a designation of a smart flow;
a disposing unit configured to dispose a plurality of regions in a first row or a first column within a page;
a determining unit configured to determine a starting position for a region to be disposed in a second row or a second column, based on a difference in size between the plurality of regions disposed in the first row or the first column by the disposing unit; and
a specification unit configured to specify a region in the first row or the first column which exceeds the determined starting position,
wherein the disposing unit disposes a region in the second row or the second column which is not influenced by the specified region based on the determined starting position, and disposes a region in the second row or the second column which is influenced by the specified region based on a size of the specified region, when the designation is received, and
wherein a position of an upper side or a left side of the region in the second row or the second column which is not influenced by the specified region is different from a position of an upper side or a left side of the region in the second row or the second column which is influenced by the specified region when the designation is received, and the position of an upper side or a left side of the region in the second row or the second column which is not influenced by the specified region is the same as the position of an upper side or a left side of the region in the second row or the second column which is influenced by the specified region when the designation is not received.

2. The information processing apparatus according to claim 1, wherein the region is a region wherein content data is input.

3. A control method comprising:
receiving a designation of a smart flow;
disposing a plurality of regions in a first row or a first column within a page;
determining, using a processor, a starting position for a region to be disposed in a second row or a second column, based on a difference in size between the plurality of regions disposed in the first row or the first column; and
specifying a region in the first row or the first column which exceeds the determined starting position,
wherein the disposing further comprises disposing a region in the second row or the second column which is not influenced by the specified region based on the determined starting position, and disposing a region in the second row or the second column which is influenced by the specified region based on a size of the specified region, when the designation is received, and
wherein a position of an upper side or a left side of the region in the second row or the second column which is not influenced by the specified region is different from a position of an upper side or a left side of the region in the second row or the second column which is influenced by the specified region when the designation is received, and the position of an upper side or a left side of the region in the second row or the second column which is not influenced by the specified region is the same as the position of an upper side or a left side of the region in the second row or the second column which is influenced by the specified region when the designation is not received.

4. The control method according to claim 3, wherein the region is a region wherein content data is input.

5. A non-transitory computer-readable storage medium storing instructions which, when executed by one or more processors, cause the one or more processors to perform operations comprising:
   receiving a designation of a smart flow;
   disposing a plurality of regions in a first row or a first column within a page;
   determining a starting position for a region to be disposed in a second row or a second column, based on a difference in size between the plurality of regions disposed in the first row or the first column; and
   specifying a region in the first row or the first column which exceeds the determined starting position,
   wherein the disposing further comprises disposing a region in the second row or the second column which is not influenced by the specified region based on the determined starting position, and disposing a region in the second row or the second column which is influenced by the specified region based on a size of the specified region, when the designation is received, and
   wherein a position of an upper side or a left side of the region in the second row or the second column which is not influenced by the specified region is different from a position of an upper side or a left side of the region in the second row or the second column which is influenced by the specified region when the designation is received, and the position of an upper side or a left side of the region in the second row or the second column which is not influenced by the specified region is the same as the position of an upper side or a left side of the region in the second row or the second column which is influenced by the specified region when the designation is not received.

6. The non-transitory computer-readable storage medium according to claim 5, wherein said region is a region wherein content data is input.

* * * * *